(12) United States Patent
Brunner

(10) Patent No.: US 11,777,723 B2
(45) Date of Patent: Oct. 3, 2023

(54) POST-RECEPTION SYNCHRONIZATION IN A CONTINUOUS VARIABLE QUANTUM KEY DISTRIBUTION (CV-QKD) SYSTEM

(71) Applicant: Huawei Technologies Duesseldorf GmbH, Munich (DE)

(72) Inventor: Hans Brunner, Munich (DE)

(73) Assignee: Huawei Technologies Duesseldorf GmbH, Munich (DE)

( * ) Notice: Subject to any disclaimer, the term of this patent is extended or adjusted under 35 U.S.C. 154(b) by 248 days.

(21) Appl. No.: 17/372,318

(22) Filed: Jul. 9, 2021

(65) Prior Publication Data
US 2021/0336777 A1  Oct. 28, 2021

Related U.S. Application Data

(63) Continuation of application No. PCT/EP2019/079062, filed on Oct. 24, 2019.

(51) Int. Cl.
*H04L 9/08* (2006.01)
*H04B 10/70* (2013.01)

(52) U.S. Cl.
CPC ............ *H04L 9/0858* (2013.01); *H04B 10/70* (2013.01)

(58) Field of Classification Search
CPC .............................. H04L 9/0858; H04B 10/70
See application file for complete search history.

(56) References Cited

U.S. PATENT DOCUMENTS

| 6,289,104 | B1* | 9/2001 | Patterson | H04L 9/0858 398/40 |
| 9,906,311 | B1* | 2/2018 | DeRose | H04B 10/70 |
| 2009/0268901 | A1* | 10/2009 | Lodewyck | H04L 9/0858 380/279 |
| 2016/0337032 | A1* | 11/2016 | Johnson | H04L 63/061 |

(Continued)

FOREIGN PATENT DOCUMENTS

| CN | 109586911 A | 4/2019 |
| WO | 2018162042 A1 | 9/2018 |

OTHER PUBLICATIONS

Maroy et al.; "Secure Detection in Quantum Key Distribution by Real-time Calibration Receiver", 2017, IOP Plubshing, Quantum Sci. Technology, pp. 1-11. (Year: 2017).*

(Continued)

*Primary Examiner* — Matthew Smithers
(74) *Attorney, Agent, or Firm* — Leydig, Voit & Mayer, Ltd.

(57) ABSTRACT

A transmitter Continuous-Variable Quantum Key Distribution (CV-QKD) device stores and transmits a quantum signal over a communication channel. A receiver CV-QKD device receives the quantum signal via the communication channel and via a reception band. The receiver CV-QKD device determines a quantum communication channel. The receiver CV-QKD device communicates the determined quantum communication channel to the transmitter CV-QKD device over an authenticated communication channel. The transmitter CV-QKD device obtains a modified quantum signal by modifying the stored quantum signal based on the determined quantum communication channel. The transmitter CV-QKD device and the receiver CV-QKD device generate a secret key using the modified quantum signal and the received quantum signal.

20 Claims, 17 Drawing Sheets

(56) References Cited

U.S. PATENT DOCUMENTS

| | | | | |
|---|---|---|---|---|
| 2020/0014533 | A1* | 1/2020 | Fung | H04L 5/0007 |
| 2020/0059358 | A1* | 2/2020 | Legré | G06N 10/00 |
| 2020/0195428 | A1* | 6/2020 | Rhee | H04L 9/0819 |
| 2020/0304300 | A1* | 9/2020 | Rhee | H04B 10/70 |
| 2021/0028865 | A1* | 1/2021 | Figueroa | H04L 9/0855 |
| 2021/0058244 | A1* | 2/2021 | Jacak | H04L 9/0852 |
| 2021/0119786 | A1* | 4/2021 | Bucklew | H04B 10/70 |

OTHER PUBLICATIONS

Soh et al., "Self-Referenced Continuous-Variable Quantum Key Distribution Protocol," Physical Review X, vol. 5, 041010, XP055556772, total 16 pages, Published by the American Physical Society (Oct. 2015).

Schrenk et al., "High-Rate Continuous-Variables Quantum Key Distribution with Piloted-Disciplined Local Oscillator," 2017 European Conference on Optical Communication (ECOC), IEEE, XP033336337, total 4 pages (Sep. 2017).

Qi et al., "Generating the Local Oscillator "Locally" in Continuous-Variable Quantum Key Distribution Based on Coherent Detection," Physical Review X, vol. 5, No. 4, XP055316967, total 12 pages, Published by the American Physical Society (2015).

Lo et al., "Measurement device independent quantum key distribution," arxiv.org, Cornell University Library, 201 Olin Library Cornell University Ithaca, NY 14853, XP080526201, total 8 pages (Sep. 2011).

CN/201980081025.X, Office Action and Search Report, dated Aug. 16, 2023.

* cited by examiner

100

101 — Storing and transmitting, by the transmitter CV-QKD device 'A', a quantum signal over a communication channel, wherein the quantum signal has a first phase, a first central frequency, a first pulse shape, and a first bandwidth.

102 — Receiving, by the receiver CV-QKD device 'B', the quantum signal via the communication channel and via a reception band of the receiver CV-QKD device 'B', the reception band having a second central frequency and a second bandwidth, wherein the second central frequency is offset from the first central frequency by a frequency shift caused by the communication channel, wherein the received quantum signal has a second phase and a second pulse shape, wherein the second phase is offset from the first phase by a phase shift caused by the communication channel and the second pulse shape is offset from the first pulse shape by a delay caused by the communication channel.

103 — Determining, by the receiver CV-QKD device 'B', a quantum communication channel based on the phase shift, the frequency shift, the delay, and a third bandwidth resulting from an overlap between the first bandwidth around the first central frequency and the second bandwidth around the second central frequency.

104 — Communicating, by the receiver CV-QKD device 'B', the determined quantum communication channel to the transmitter CV-QKD device 'A' over an authenticated communication channel.

105 — Obtaining, by the transmitter CV-QKD device 'A', a modified quantum signal by modifying the stored quantum signal based on the determined quantum communication channel.

106 — Generating, by the transmitter CV-QKD device 'A' and the receiver CV-QKD device 'B', a secret key using the modified quantum signal and the received quantum signal.

FIG. 1

301 — Receiving, from a transmitter CV-QKD device 'A' transmitting a quantum signal over a communication channel, wherein the transmitted quantum signal has a first phase, a first central frequency, a first pulse shape, and a first bandwidth, the quantum signal via the communication channel and via a reception band of the receiver CV-QKD device 'B', the reception band having a second central frequency and a second bandwidth, wherein the second central frequency is offset from the first central frequency by a frequency shift caused by the communication channel, wherein the received quantum signal has a second phase and a second pulse shape, wherein the second phase is offset from the first phase by a phase shift caused by the quantum communication channel and the second pulse shape is offset from the first pulse shape by a delay caused by the communication channel.

302 — Determining a quantum communication channel based on the received quantum signal, the phase shift, the frequency shift, the delay, and a third bandwidth resulting from an overlap between the first bandwidth around the first central frequency and the second bandwidth around the second central frequency.

303 — Sending, to the transmitter CV-QKD device 'A', the determined quantum communication channel, the phase shift, the frequency shift, the delay, and the third bandwidth over an authenticated communication channel.

304 — Generating a secret key using the received quantum signal.

FIG. 3

POST-RECEPTION SYNCHRONIZATION IN A CONTINUOUS VARIABLE QUANTUM KEY DISTRIBUTION (CV-QKD) SYSTEM

CROSS-REFERENCE TO RELATED APPLICATIONS

This application is a continuation of International Application No. PCT/EP2019/079062, filed on Oct. 24, 2019, the disclosure of which is hereby incorporated by reference in its entirety.

FIELD

The present application relates generally to the field of Continuous-Variable Quantum Key Distribution (CV-QKD), and particularly to a CV-QKD system, a transmitter CV-QKD device and a receiver CV-QKD device and corresponding methods, for implementing post-reception synchronization in the CV-QKD. The application applies CV-QKD, which is a technique for generating secret keys in such a way that the security of the key generation is guaranteed by quantum physics.

BACKGROUND

In conventional optical data communications, an eavesdropper can learn the transmitted signal by splitting off and detecting a fraction of the information carrying light. An eavesdropper needs to have means for acquiring the key used for encryption to extract the data from an encrypted signal. In conventional devices and methods, the encryption key is typically distributed between the encrypter and the decrypter by public-key exchange secured by computational complexity, e.g., Diffie-Hellman (DH) or Rivest-Shamir-Adleman (RSA). However, the problem emerges that encryption based on such a key exchange might be broken as soon as a sufficiently powerful quantum computer is available. Even worse, all such encrypted data, stored in some way, can be broken retroactively.

Moreover, similar to optical data communications, a QKD transmitter device encodes a sequence of symbols in light and sends it to a QKD receiver device. The security of QKD is based on the no-cloning theorem of quantum mechanics. It is not possible to copy a signal encoded in light (or a fraction of it) without leaving a trace. Such a trace can be expressed as an additional source of noise in general, i.e., the excess noise. Furthermore, based on estimates for the transmit power, channel loss and excess noise, an upper bound to the information accessible to any eavesdropper may be derived. Besides, if this upper bound is sufficiently small, a secret key can be extracted from the information shared between the QKD transmitter device and the QKD receiver device. Under certain conditions, this secret key extraction can be proven to be information-theoretically secure.

Furthermore, from an application point of view, a QKD system has to be regarded as a quantum random number generator which is accessible to exactly two (distant) parties. Without an input signal, an ideal coherent detector measures the unbiased ground state. Measurements of the ground state are according to the uncertainty principle draws from an unpredictable quantum random number generator with a circular-symmetric identical-and-independent normal distribution. The transmitter device can change the mean of this normal distribution by injecting a signal. The receiver device does not take measurements of the ground state anymore but, e.g., from another coherent state. In other words, the transmitter device can tune the probabilities of the random number generator at the receiver device. It is important to acknowledge that, in contrast to data transmission, the transmit signal per se is irrelevant and does not need to be reconstructed at the receiver device. Information about the receive state at the transmitter device is what enables key distribution.

For strict security analysis, it is often necessary to attribute all power lost and all noise on top of the fundamental shot noise to the eavesdropper. This puts the eavesdropper in the most powerful position limited only by the laws of quantum mechanics. The transmit power in QKD is in general at single photon level, e.g., $-90$ dBm for a 10 MHz symbol rate at 193 THz. The signal at the receiver is weak compared to the shot noise in the detection and has a Signal-to-Noise-Ratio (SNR) typically between $-10$ dB and $-20$ dB. Reliable detection of such a weak signal with such a narrow bandwidth at such a high carrier frequency is a difficult task. Even more problematic, imperfect synchronization between transmitter and receiver clocks in frequency and/or phase for the carrier frequency, sampling frequency and/or data alignment will cause additional loss and/or noise. This additional loss and noise is typically also regarded as in the hands of the eavesdropper, the trace of an attack, and might prevent key generation.

CV-QKD requires precise synchronization in carrier and sampling frequency and phase. The present disclosure proposes a feed-forward method, which supports these synchronization tasks with high precision after the signal detection.

There are various techniques of carrier clock synchronization in CV-QKD systems. In general, "inline" local oscillator setups and "local" local oscillator setups have to be distinguished. In the "inline" local oscillator setups, there is no separate laser at the receiver. The transmitter time interleaves the quantum signal with strong pulses of light, the "inline" local oscillator, these are then delayed at the receiver and beaten with the following quantum signal. Furthermore, since the quantum signal and the local oscillator originated from the same laser, may be even during its coherence time, the quantum signal is down-converted with a frequency and phase synchronized carrier with some remaining phase noise. The drawbacks of these methods are that the "inline" local oscillator might spill a substantial amount of power into the quantum time slots, which again could prevent key generation. Moreover, since the local oscillator is sent over the channel, it is potentially in the hands of the eavesdropper. The eavesdropper could vary the power of the "inline" local oscillator in such a way, that it could hide a copying attack in an undetectable way, which means that all security is lost.

In "local" local oscillator setups there is a transmitter and a receiver side laser. The receiver side laser needs to be aligned to the transmit side laser in frequency and phase. This is typically done by locking onto a pilot tone, which is sent from the transmitter device. This pilot tone is sent either in a different polarization or separated by frequency or time. The pilot tone can have a much stronger power since it does not leak information and is assumed to be known to the eavesdropper from the beginning on. This strong power signal can be found much more easily compared to the quantum signal and it also has a much better SNR. The high SNR allows extracting the precise frequency and phase information. This information can be used to align the receiver side laser optically or compensate the error digitally. The pilot tone can be detected with the same or different detector(s) as the quantum channel.

FIGS. 17a, b, c and d are schematic views of conventional software defined transmitter and different detector implementation possibilities, in which, FIG. 17a is a schematic view of a conventional single quadrature intradyne or homodyne detection, FIG. 17b is a schematic view of a conventional dual quadrature intradyne or homodyne detection, FIG. 17c is a schematic view of a conventional heterodyne detection system, and FIG. 17d is a schematic view of a conventional CV-QKD transmitter device.

FIG. 17a and FIG. 17b show the detection of the quantum channel in the most common setups, where the pilot tone and the quantum signal are detected with different detectors. The receiver side laser $E_L$ is used to down-convert the quantum channel and detect it. Either only the in-phase component is detected, FIG. 17a, which requires that frequency and phase of $E_L$ are aligned precisely to the transmit side laser, or both phase components are detected, FIG. 17b, which requires only that the frequency of $E_L$ is aligned precisely to the transmit side laser. Since both phase space components are detected, the phase can be corrected in software afterwards.

FIG. 17c shows a heterodyne detection, which relaxes the frequency and phase alignment such that precise frequency and phase correction can be done in software. A coarse frequency alignment is still necessary such that the transmit signal stays in the detectable bandwidth. From a communication point of view, both setups illustrated in FIG. 17b and FIG. 17c reach the same performance and the same SNR, however, they have different implementation issues. For example, while the dual quadrature homodyne or intradyne has a larger optical complexity, it directly recovers the baseband signal after the balanced detectors, which offers the largest signal-detection bandwidth for a given balanced-detector bandwidth. Moreover, for the heterodyne detection instead, the main complexity is in the electrical domain. As the detected signal is still modulated at an intermediate frequency, the balanced detector has a larger bandwidth to support the signal bandwidth. However, the heterodyne detection is especially beneficial for the CV-QKD for two reasons. The first reason is that it allows for a reduced system complexity by using electronic integration, and the second reason is that it improves robustness since the electrical signal is amplified right after detection and before being processed in the electrical domain, thus it relaxes the requirements for subsequent signal-mixing and processing stages. The achievable key rate and the supported reach with a strict security model benefit more from reducing the losses and noise in the system than from increasing the raw symbol rate.

Consider a scenario in which the optical channel is contaminated with additional broadband noise, e.g., Raman noise from copropagating, high-power, classical channels. The heterodyne setup of FIG. 17c can only support half the additional broadband noise compared to setups of FIG. 17a and FIG. 17b, since it suffers from the additional broadband noise in the mirror band. As a consequence, the reach and the key-rate in a scenario with classical channels copropagating on the same fiber as the QKD signal can be significantly less with the heterodyne setup.

Many CV-QKD setups are similar to the one shown in FIG. 17b in that they use different detectors for the quantum channel and the pilot tone. However they require a complex optical system and they require the two detectors to be synchronized with each other. By contrast, a heterodyne detector can detect both the pilot tone and the quantum channel with simpler optics and simpler synchronization.

It is important to note that several measurements are needed to ensure the security of the CV-QKD systems. Firstly, if each measurement detects only one quadrature of the incoming light, the phase of the local oscillator is randomized. This will give access to both quadratures, which is necessary to detect attacks that are based on squeezed states. Secondly, the system needs to be protected against side channel attacks. This can be done by adding isolators and optical filters at the output of the transmitter device and the input of the receiver device, and by monitoring the output of the transmitter device and the shot noise at the detector.

Soh et al, "Self-Referenced Continuous-Variable Quantum Key Distribution Protocol", Physical Review X 5, 0410110 (2015), have introduced a new CV-QKD protocol, self-referenced CV-QKD, that eliminates the need for transmission of a high-power local oscillator between the communicating parties.

SUMMARY

The present application provides an improvement over the conventional CV-QKD systems, the CV-QKD transmitter devices, the CV-QKD receiver devices and methods. Embodiments of the disclosure provide an implementation of a new protocol for QKD. Further, multiple synchronization issues including constant phase errors, frequency offsets, and phase noise in the carrier and sampling clock are addressed.

In particular, the embodiments of the application provide a new protocol for QKD, where the cached transmit signal is digitally synchronized after the transmission to the measurement of the receiver device. To allow this, the transmitter device can send a signal with a larger bandwidth than the effective quantum channel. The effective quantum channel can be decided by the measurement at the receiver device. Moreover, the quantum channel can be measured and communicated to the transmitter device. Afterwards (i.e. after reception), the transmit signal can be altered to be synchronized with the received signal according to the quantum channel measurement and the processing of the receiver device. The altered signal at the transmitter device can be further used for post-processing and generating a secret key.

The system, devices and methods according to embodiments of the application allow compensating synchronization errors even in setups with single quadrature measurements since the transmitter device has access to all degrees of freedom. It supports digital, high-precision, feed-forward compensation of synchronization errors origination from any of the involved clock pairs; carrier phase offset, carrier frequency offset, phase noise, sampling clock phase offset, and sampling clock frequency offset. The embodiments of the application allow a simple method for implementing multi-device synchronization and, therefore, is an enabler for measurement-device-independent QKD.

The objective is achieved by the embodiments provided in the enclosed independent claims. Advantageous implementations of the embodiments are further defined in the dependent claims.

A first aspect of the application provides a method for operating a Continuous Variable-Quantum Key Distribution (CV-QKD) system comprising a transmitter CV-QKD device 'A' and a receiver CV-QKD device 'B', wherein the method comprises: storing and transmitting, by the transmitter CV-QKD device 'A', a quantum signal over a communication channel, wherein the quantum signal has a first phase, a first central frequency, a first pulse shape, and a first bandwidth; receiving, by the receiver CV-QKD device 'B', the quantum signal via the communication channel and via a reception band of the receiver CV-QKD device 'B', the reception band having a second central frequency and a second bandwidth, wherein the second central frequency is offset from the first central frequency by a frequency shift caused by the communication channel, wherein the received quantum signal has a second phase and a second pulse shape, wherein the second phase is offset from the first phase by a phase shift caused by the communication channel and the second pulse shape is offset from the first pulse shape by a delay caused by the communication channel; determining, by the receiver CV-QKD device 'B', a quantum communication channel based on the phase shift, the frequency shift, the delay, and a third bandwidth resulting from an overlap between the first bandwidth around the first central frequency and the second bandwidth around the second central frequency; communicating, by the receiver CV-QKD device 'B', the determined quantum communication channel to the transmitter CV-QKD device 'A' over an authenticated communication channel; obtaining, by the transmitter CV-QKD device 'A', a modified quantum signal by modifying the stored quantum signal based on the determined quantum communication channel; and generating, by the transmitter CV-QKD device 'A' and the receiver CV-QKD device 'B', a secret key using the modified quantum signal and the received quantum signal.

The method of the first aspect may be performed by a CV-QKD system comprising at least one transmitter CV-QKD system and a receiver CV-QKD device.

The received quantum signal may be a signal that is generated by the receiver CV-QKD device 'B' in response to the incoming quantum signal. The incoming quantum signal is the quantum signal at the end of the communication channel. In other words, the receiver CV-QKD device 'B' translates an incoming version of the quantum signal into the received quantum signal. The received quantum signal may be further processed or analyzed.

For example, the actual transmit quantum signal may be decided (i.e., determined) by the receiver CV-QKD device 'B' after the transmission is done.

Moreover, the method of the first aspect may solve the synchronization issue of carrier frequency offset and sampling clock skew (i.e., delay in pulse shape). Additionally, it may also be generalized for phase noise. Moreover, an additional authenticated channel may be used for bidirectional communication that allows the transmitter CV-QKD device 'A' and the receiver CV-QKD device 'B' to exchange information.

In an implementation form of the first aspect, the first bandwidth is larger than the third bandwidth, the method further comprising allocating a larger bandwidth to the transmitter CV-QKD device 'A' than to the receiver CV-QKD device 'B', and wherein the allocated bandwidth of the receiver CV-QKD device 'B' is within the allocated bandwidth of the transmitter CV-QKD device 'A'.

In a further implementation form of the first aspect, the method further comprising modulating the quantum signal based on a Gaussian modulation scheme, wherein each quantum signal is obtained from a quantum random number generator, and comprises a real part associated with an in-phase component of an optical field of CV-QKD system and an imaginary part associated with a quadrature component of the optical field.

The embodiments of the present application are not limited to a specific modulation, in particular, are independent of the used modulation, and it may work for any modulation.

In a further implementation form of the first aspect, the method further comprising receiving, by the receiver QKD device 'B', a part of the transmitted quantum signal transmitted by the transmitter QKD device 'A'.

In a further implementation form of the first aspect, at least one of:
the phase shift is time dependent,
the phase shift is frequency dependent,
the frequency shift is time dependent,
the delay is time dependent,
the delay is frequency dependent, or
the third bandwidth is time dependent.

In particular, adding a time dependent phase shift may be represented by multiplying by the factor $e^{-i\varphi(t)}$. Moreover, the OM term may split into a constant part $\varphi_0$, a linear part $\omega t$, and a non-linear part $\varphi(t)$. This may result in $e^{-i(\varphi_0+\omega t+\phi(t))}$, where $\varphi_0$ is typically called the phase offset, $\omega t$ is the frequency offset, and $\phi(t)$ is the phase noise.

In a further implementation form of the first aspect, the method further comprising upconverting, a quantum signal of the transmitter CV-QKD device 'A' to a single-side-band signal with a first intermediate frequency, and/or downconverting a quantum signal of the receiver CV-QKD device 'B' from a second intermediate frequency.

In a further implementation form of the first aspect, the method further comprising allocating a mirror band to a quantum signal of the receiver CV-QKD device 'B', wherein a part of a quantum signal of the transmitter CV-QKD device 'A' is within the mirror band, and wherein the method further comprises, receiving, by the receiver CV-QKD device 'B', a part of the transmitted quantum signal of the transmitter CV-QKD device 'A' that is within the mirror band.

In a further implementation form of the first aspect, the method further comprising allocating multiple quantum bands to the receiver CV-QKD device 'B', wherein each quantum band is associated with a respective second intermediate frequency, and wherein each allocated quantum band has a mirror band.

In a further implementation form of the first aspect, the method further comprising determining, by the receiver CV-QKD device 'B', the second intermediate frequency according to at least one of:
a predefined fixed frequency,
changing in an adaptive manner, or
selected randomly.

In a further implementation form of the first aspect, the method further comprising transmitting, by the transmitter CV-QKD device 'A', two quantum signals each having a different first bandwidth, wherein the two quantum signals include: a first transmitted quantum signal associated with a respective first bandwidth that is equal to a third bandwidth of a given allocated quantum band of the receiver CV-QKD device 'B', wherein the first transmitted quantum signal of the transmitter CV-QKD device 'A' overlaps the given allocated quantum band of the receiver CV-QKD device 'B', and a second transmitted quantum signal associated with a respective first bandwidth that is larger than the third bandwidth of the mirror band of the given quantum signal of the receiver CV-QKD device 'B', wherein the second transmitted quantum signal is within the mirror band.

In a further implementation form of the first aspect, the method further comprising receiving, by the receiver CV-QKD device 'B', the first transmitted quantum signal and/or the second transmitted quantum signal, at least in part, such that the received signals mix in a down-conversion operation.

In a further implementation form of the first aspect, the method further comprising multiplexing, one or more pilot tones and/or a synchronization channel with the quantum communication channel, in order to estimate a time and/or frequency dependent phase shift and/or a time dependent frequency shift and/or a time and/or frequency dependent delay, and determining, by the receiver CV-QKD device 'B', the quantum communication channel based on the estimated time and/or a frequency dependent phase change.

In a further implementation form of the first aspect, the method further comprising multiplexing and/or de-multiplexing, the quantum signals using an orthogonal frequency-division multiplexing (OFDM) by allocating a first set of OFDM sub-channels to the quantum signals and using a second set of OFDM sub-channels for guarding the quantum signals.

In a further implementation form of the first aspect, the method further comprising multiplexing and/or de-multiplexing, the quantum signals and the synchronization channel using OFDM, by allocating a first set of OFDM sub-channels to the quantum signals and a second set of OFDM sub-channels to the synchronization channel, and using a third set of OFDM sub-channels for guarding the quantum signals.

In a further implementation form of the first aspect, the method further comprising compensating, by the receiver CV-QKD device 'B', at least one of: the phase shift based on estimating a phase noise from the one or more pilot tones and/or the synchronization channel, and/or the delay shift based on estimating a delay from the synchronization channel.

In a further implementation form of the first aspect, the CV-QKD system is based on a Measurement-Device-Independent (MDI-CV-QKD) system comprising multiple QKD devices including two or more transmitter CV-QKD devices and at least one receiver CV-QKD device, wherein the method further comprises: storing and transmitting, for each transmitter CV-QKD device, a respective quantum signal over a respective communication channel, wherein each respective quantum signal has a respective first phase, a respective first central frequency, a respective first pulse shape, and a respective first bandwidth; receiving, by a receiver CV-QKD device, a combined signal comprising the multiple transmitted quantum signals via the communication channels and via a reception band of the receiver CV-QKD device 'B', the reception band having a second central frequency and respective second bandwidths, wherein the second central frequency is offset from the first central frequencies by frequency shifts caused by the communication channels, wherein the received combined signal has a second phase and a second pulse shape, wherein the second phase is offset from the first phases by phase shifts caused by the communication channels, and the second pulse shape is offset from the first pulse shapes by delays caused by the communication channels; determining the quantum communication channels based on the phase shifts, the frequency shifts, the delays, and third bandwidths resulting from overlaps between the first bandwidths around the first central frequencies and the second bandwidths around the second central frequencies; communicating the determined quantum communication channels over authenticated communication channels; obtaining, individually, for each respective transmitter CV-QKD device, a respective modified quantum signal by modifying its corresponding stored quantum signal based on its respective determined quantum communication channel; and generating a secret key using a respective modified quantum signal and the received combined quantum signal.

A second aspect of the application provides a method for a transmitter CV-QKD device 'A', wherein the method comprises: transmitting to a receiver CV-QKD device 'B' and storing, a quantum signal over a communication channel, wherein the quantum signal has a first phase, a first central frequency, a first pulse shape, and a first bandwidth; receiving, from the receiver CV-QKD device 'B', a determined quantum communication channel, a phase shift, a frequency shift, a delay, and a third bandwidth over an authenticated communication channel; obtaining a modified quantum signal by modifying the stored quantum signal based on the phase shift, the frequency shift, the delay, and the third bandwidth; and generating a secret key using the modified quantum signal.

The method of the second aspect may be performed by a transmitter CV-QKD device and/or a CV-QKD system.

In an implementation form of the second aspect, the method further comprising upconverting, a quantum signal to a single-side-band signal with a first intermediate frequency.

In a further implementation form of the second aspect, the method further comprising: transmitting two quantum signals each having a different first bandwidth, wherein the two quantum signals include: a first transmitted quantum signal associated with a respective first bandwidth that is equal to a third bandwidth of a given allocated quantum band of the receiver CV-QKD device 'B', wherein the first transmitted quantum signal of the transmitter CV-QKD device 'A' overlaps the given allocated quantum band of the receiver CV-QKD device 'B', and a second transmitted quantum signal associated with a respective first bandwidth that is larger than the third bandwidth of the mirror band of the given quantum signal of the receiver CV-QKD device 'B', wherein the second transmitted quantum signal is within the mirror band.

In a further implementation form of the second aspect, the first bandwidth is larger than the third bandwidth, the method further comprising allocating a larger bandwidth to the transmitter CV-QKD device 'A' than to the receiver CV-QKD device 'B', and wherein the allocated bandwidth of the receiver CV-QKD device 'B' is within the allocated bandwidth of the transmitter CV-QKD device 'A'.

In a further implementation form of the second aspect, the method further comprising modulating the quantum signal based on a Gaussian modulation scheme, wherein each quantum signal is obtained from a quantum random number generator, and comprises a real part associated with an in-phase component of an optical field of CV-QKD system and an imaginary part associated with a quadrature component of the optical field.

In a further implementation form of the second aspect, wherein at least one of:
 the phase shift is time dependent,
 the phase shift is frequency dependent,
 the frequency shift is time dependent,
 the delay is time dependent,
 the delay is frequency dependent, or
 the third bandwidth is time dependent.

A third aspect of the application provides a CV-QKD device 'A' configured to perform the steps of the method of the second aspect or one of the implementation form of the second aspect.

The CV-QKD device 'A' may be a transmitter CV-QKD device. Moreover, the transmitter CV-QKD device 'A' may comprise a circuitry. The circuitry may comprise hardware and software. The hardware may comprise analog or digital circuitry, or both analog and digital circuitry. In some embodiments, the circuitry comprises one or more processors and a non-volatile memory connected to the one or more processors. The non-volatile memory may carry executable program code which, when executed by the one or more processors, causes the device to perform the operations or methods described herein.

A fourth aspect of the application provides a computer program configured to control a CV-QKD device 'A' to perform the steps of the method of the second aspect or one of the implementation form of the second aspect.

A fifth aspect of the application provides a method for a receiver CV-QKD device 13', wherein the method comprises: receiving, from a transmitter CV-QKD device 'A' transmitting a quantum signal over a communication channel, wherein the transmitted quantum signal has a first phase, a first central frequency, a first pulse shape, and a first bandwidth, the quantum signal via the communication channel and via a reception band of the receiver CV-QKD device 'B', the reception band having a second central frequency and a second bandwidth, wherein the second central frequency is offset from the first central frequency by a frequency shift caused by the communication channel, wherein the received quantum signal has a second phase and a second pulse shape, wherein the second phase is offset from the first phase by a phase shift caused by the quantum communication channel and the second pulse shape is offset from the first pulse shape by a delay caused by the communication channel; determining a quantum communication channel based on the received quantum signal, the phase shift, the frequency shift, the delay, and a third bandwidth resulting from an overlap between the first bandwidth around the first central frequency and the second bandwidth around the second central frequency; sending, to the transmitter CV-QKD device 'A', the determined quantum communication channel, the phase shift, the frequency shift, the delay, and the third bandwidth over an authenticated communication channel; and generating a secret key using the received quantum signal.

The received quantum signal may be a signal that is generated by the receiver CV-QKD device 'B' in response to the incoming quantum signal. The incoming quantum signal is the quantum signal at the end of the communication channel. In other words, the receiver CV-QKD device 'B' translates an incoming version of the quantum signal into the received quantum signal. The received quantum signal may be further processed or analyzed.

The method of fifth aspect may be performed by a receiver CV-QKD device and/or a CV-QKD system.

In an implementation form of the fifth aspect, the method further comprising: receiving a part of the transmitted quantum signal transmitted by the transmitter CV-QKD device 'A'.

In a further implementation form of the fifth aspect, the first bandwidth is larger than the third bandwidth, the method further comprising allocating a larger bandwidth to the transmitter CV-QKD device 'A' than to the receiver CV-QKD device 'B', and wherein the allocated bandwidth of the receiver CV-QKD device 'B' is within the allocated bandwidth of the transmitter CV-QKD device 'A'.

In a further implementation form of the fifth aspect, the method further comprising receiving, by the receiver QKD device 'B', a part of the transmitted quantum signal transmitted by the transmitter QKD device 'A'.

In a further implementation form of the fifth aspect, at least one of:
the phase shift is time dependent,
the phase shift is frequency dependent,
the frequency shift is time dependent,
the delay is time dependent,
the delay is frequency dependent, or
the third bandwidth is time dependent.

In a further implementation form of the fifth aspect, the method further comprising down-converting a quantum signal from a second intermediate frequency.

In a further implementation form of the fifth aspect, the method further comprising allocating a mirror band to a given quantum signal, wherein a part of a quantum signal of the transmitter CV-QKD device 'A' is within the mirror band, and wherein the method further comprises, receiving a part of the transmitted quantum signal of the transmitter CV-QKD device 'A' that is within the mirror band.

In a further implementation form of the fifth aspect, the method further comprising allocating multiple quantum bands each associated with a respective second intermediate frequency, wherein each allocated quantum band has a mirror band.

In a further implementation form of the fifth aspect, the method further comprising determining, by the receiver CV-QKD device 'B', the second intermediate frequency according to one of:
a predefined fixed frequency,
changing in an adaptive manner,
selected randomly.

In a further implementation form of the fifth aspect, the method further comprising receiving, from the transmitter CV-QKD device 'A', two transmitted quantum signals each having a different first bandwidth, at least in part, such that the received signals mix in a down-conversion operation.

In a further implementation form of the fifth aspect, the method further comprising compensating at least one of: the phase shift based on estimating a phase noise from the one or more pilot tones and/or the synchronization channel, and/or the delay shift based on estimating a delay from the synchronization channel.

A sixth aspect of the application provides a CV-QKD device 'B' configured to perform the steps of the method of the fifth aspect or one of the implementation form of the fifth aspect.

The CV-QKD device 'B' may be a receiver CV-QKD device. The CV-QKD device 'B' may comprise a circuitry. The circuitry may comprise hardware and software. The hardware may comprise analog or digital circuitry, or both analog and digital circuitry. In some embodiments, the circuitry comprises one or more processors and a non-volatile memory connected to the one or more processors. The non-volatile memory may carry executable program code which, when executed by the one or more processors, causes the device to perform the operations or methods described herein.

A seventh aspect of the application provides a computer program configured to control a CV-QKD device 'B' to perform the steps of the method of the fifth aspect or one of the implementation form of the fifth aspect.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, these methods and functionalities can be implemented in respective software or hardware elements, or any kind of combination thereof.

BRIEF DESCRIPTION OF THE DRAWINGS

The above described aspects and implementation forms of the present application will be explained in the following description of exemplary embodiments in relation to the enclosed drawings, in which:

FIG. 1 is a flowchart of a method for operating a CV-QKD system comprising a transmitter CV-QKD device 'A' and a receiver CV-QKD device 'B', according to an embodiment of the application;

FIG. 3 is a flowchart of a method for a receiver CV-QKD device 'B', according to an embodiment of the application;

DETAILED DESCRIPTION

FIG. 1 is a flowchart of a method 100 for operating a CV-QKD system comprising a transmitter CV-QKD device 'A' and a receiver CV-QKD device 'B', according to an embodiment of the application.

Figure 4:
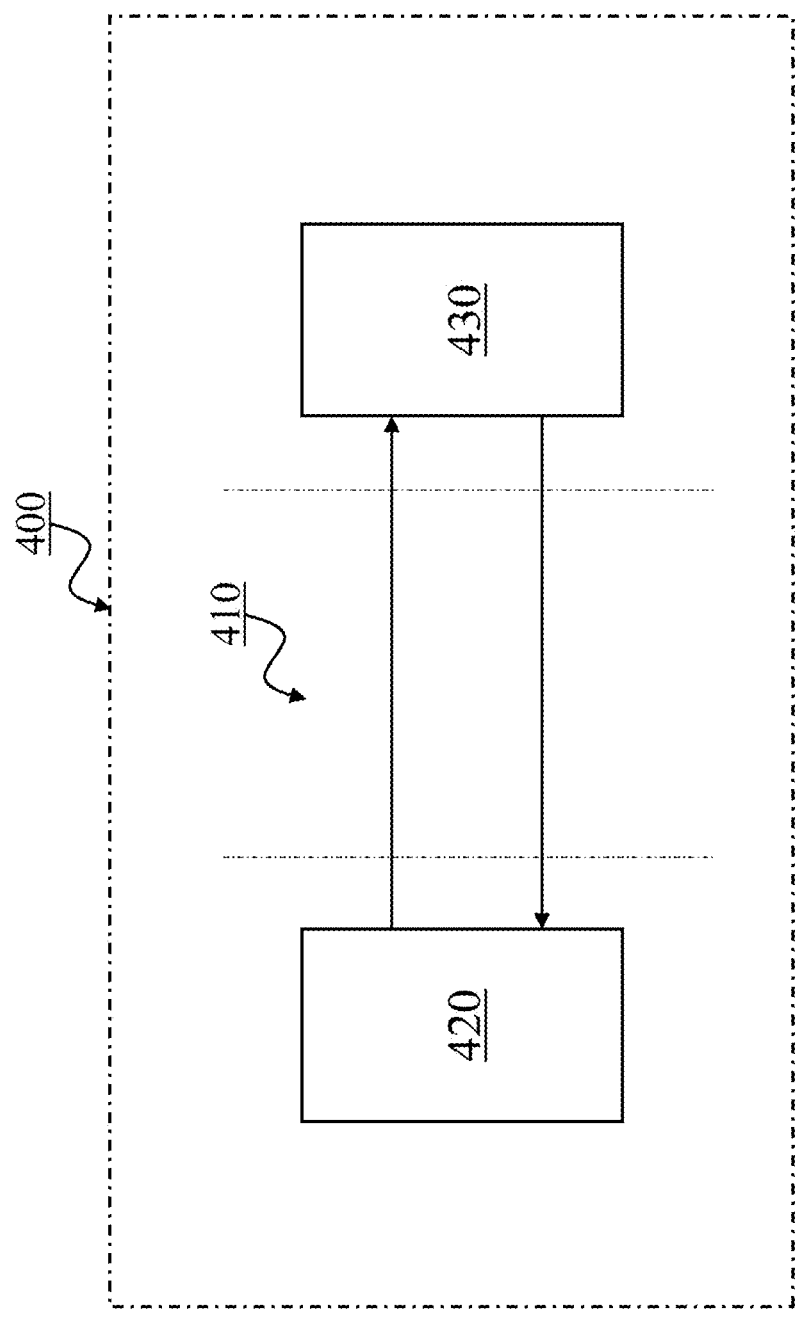
FIG. 4 is a schematic view of a CV-QKD system including a transmitter CV-QKD device 'A' and a receiver CV-QKD device '13'.

The method 100 may be performed by a CV-QKD system such as the CV-QKD system 400 of FIG. 4. The CV-QKD system may comprise a transmitter CV-QKD device and a receiver CV-QKD device. Without limiting the present disclosure, FIG. 1 is exemplarily described as a method that is performed by the CV-QKD system 400 of FIG. 4 in which some of the steps are performed by the transmitter CV-QKD device 'A' 420 of FIG. 4 and some of the steps are performed by the receiver CV-QKD device 'B' 430 of FIG. 4.

The method 100 comprises a step 101 of storing and transmitting, by the transmitter CV-QKD device 'A' 420, a quantum signal over a communication channel 410, wherein the quantum signal has a first phase, a first central frequency, a first pulse shape, and a first bandwidth.

The method 100 further comprises a step 102 of receiving, by the receiver CV-QKD device 'B' 430, the quantum signal via the communication channel 410 and via a reception band of the receiver CV-QKD device 'B' 430, the reception band having a second central frequency and a second bandwidth, wherein the second central frequency is offset from the first central frequency by a frequency shift caused by the communication channel 410, wherein the received quantum signal has a second phase and a second pulse shape, wherein the second phase is offset from the first phase by a phase shift caused by the communication channel 410, and the second pulse shape is offset from the first pulse shape by a delay caused by the communication channel 410.

The received quantum signal may be a signal that is generated by the receiver CV-QKD device 'B' in response to the incoming quantum signal. The incoming quantum signal is the quantum signal at the end of the communication channel. In other words, the receiver CV-QKD device 'B' translates an incoming version of the quantum signal into the received quantum signal. The received quantum signal may be further processed or analyzed.

The method 100 further comprises a step 103 of determining, by the receiver CV-QKD device 'B' 430, a quantum communication channel based on the phase shift, the frequency shift, the delay, and a third bandwidth resulting from an overlap between the first bandwidth around the first central frequency and the second bandwidth around the second central frequency.

The method 100 further comprises a step 104 of communicating, by the receiver CV-QKD device 'B' 430, the determined quantum communication channel to the transmitter CV-QKD device 'A' 420 over an authenticated communication channel.

The method 100 further comprises a step 105 of obtaining, by the transmitter CV-QKD device 'A' 420, a modified quantum signal by modifying the stored quantum signal based on the determined quantum communication channel.

The method 100 further comprises a step 106 of generating, by the transmitter CV-QKD device 'A' 420 and the receiver CV-QKD device 'B' 430, a secret key using the modified quantum signal and the received quantum signal.

Figure 2:
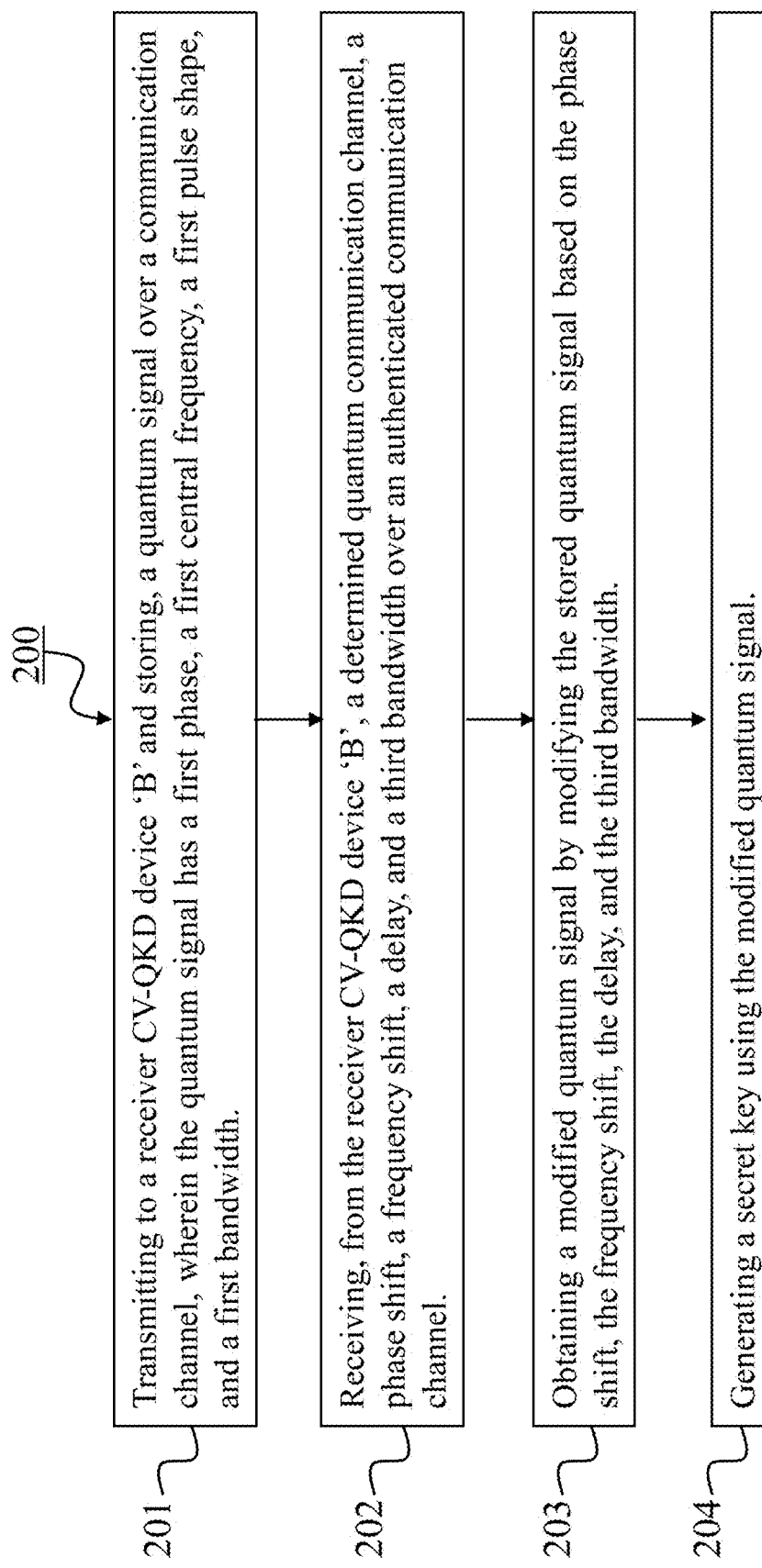
FIG. 2 is a flowchart of a method for a transmitter CV-QKD device 'A', according to an embodiment of the application.

Reference is made to FIG. 2 which is a flowchart of a method 200 for a transmitter CV-QKD device 'A' 420.

The method 200 may be performed by the transmitter CV-QKD device 'A' 420 (and/or the CV-QKD system 400).

The method 200 comprises a step 201 of transmitting to a receiver CV-QKD device 'B' 430 and storing, a quantum signal over a communication channel 410, wherein the quantum signal has a first phase, a first central frequency, a first pulse shape, and a first bandwidth.

The method 200 further comprises a step 202 of receiving, from the receiver CV-QKD device 'B' 430, a determined quantum communication channel 410, a phase shift, a frequency shift, a delay, and a third bandwidth over an authenticated communication channel.

The method 200 further comprises a step 203 of obtaining a modified quantum signal by modifying the stored quantum signal based on the phase shift, the frequency shift, the delay, and the third bandwidth.

The method 200 further comprises a step 204 of generating a secret key using the modified quantum signal.

Reference is made to FIG. 3 which is a flowchart of a method for a receiver CV-QKD device 'B'.

The method 300 may be performed by the receiver CV-QKD device 'B' 430 (and/or the CV-QKD system 400).

The method 300 comprises a step 301 of receiving, from a transmitter CV-QKD device 'A' 420 transmitting a quantum signal over a communication channel 410, wherein the transmitted quantum signal has a first phase, a first central frequency, a first pulse shape, and a first bandwidth, the quantum signal via the communication channel 410 and via a reception band of the receiver CV-QKD device 'B' 430, the reception band having a second central frequency and a second bandwidth, wherein the second central frequency is offset from the first central frequency by a frequency shift caused by the communication channel 410, wherein the received quantum signal has a second phase and a second pulse shape, wherein the second phase is offset from the first phase by a phase shift caused by the quantum communication channel 410, and the second pulse shape is offset from the first pulse shape by a delay caused by the communication channel 410.

The method 300 further comprises a step 302 of determining a quantum communication channel based on the received quantum signal, the phase shift, the frequency shift, the delay, and a third bandwidth resulting from an overlap between the first bandwidth around the first central frequency and the second bandwidth around the second central frequency.

The method 300 further comprises a step 303 of sending, to the transmitter CV-QKD device 'A' 420, the determined quantum communication channel 410, the phase shift, the frequency shift, the delay, and the third bandwidth over an authenticated communication channel.

The method 300 further comprises a step 304 of generating a secret key using the received quantum signal.

Reference is made to FIG. 4 which is a schematic view of a CV-QKD system 400 including a transmitter CV-QKD device 'A' 420 and a receiver CV-QKD device 'B' 430.

The CV-QKD system 400 comprises a communication channel 410, the transmitter CV-QKD device 'A' 420 and the receiver CV-QKD device 'B' 430.

Moreover, for instance, the CV-QKD system 400 may be configured to perform the method of the first aspect or one of the implementation form of the first aspect, e.g., the CV-QKD system 400 may be configured to perform the method 100 described in FIG. 1.

The CV-QKD system 400 comprises the transmitter CV-QKD device 'A' 420. For instance, the transmitter CV-QKD device 'A' 420 may be configured to perform the steps of the method of the second aspect or one of the implementation form of the second aspect. For example, the transmitter CV-QKD device 'A' 420 may be configured to perform the method 200 described in FIG. 2.

The transmitter CV-QKD device 'A' 420 may comprise a circuitry (not shown in FIG. 4). The circuitry may comprise hardware and software. The hardware may comprise analog or digital circuitry, or both analog and digital circuitry. In some embodiments, the circuitry comprises one or more processors and a non-volatile memory connected to the one or more processors. The non-volatile memory may carry executable program code which, when executed by the one or more processors, causes the device to perform the operations or methods described herein.

The CV-QKD system 400 further comprises the receiver CV-QKD device 'B' 430. For instance, the receiver CV-QKD device 'B' 430 may be configured to perform the steps of the method of the fifth aspect or one of the implementation form of the fifth aspect. For example, the receiver CV-QKD device 'B' 430 may be configured to perform the method 300 described in FIG. 3.

The receiver CV-QKD device 'B' 430 may comprise a circuitry (not shown in FIG. 4). The circuitry may comprise hardware and software. The hardware may comprise analog or digital circuitry, or both analog and digital circuitry. In some embodiments, the circuitry comprises one or more processors and a non-volatile memory connected to the one or more processors. The non-volatile memory may carry executable program code which, when executed by the one or more processors, causes the device to perform the operations or methods described herein.

For example, a new QKD protocol may be proposed. In this protocol, the transmitter CV-QKD device 'A' 420 sends and remembers a signal (a series of states), which has a larger bandwidth/baud rate than the effective quantum channel. The transmitter CV-QKD device 'A' 420 does not know in advance, how this transmit signal will be transformed into the quantum channel. In the channel and due to imperfections of the transmitter CV-QKD device 'A' 420 and the receiver CV-QKD device 'B' 430, the transmit signal is disturbed by convolutive, time-dependent phase changes. For example, the phase and the frequency of the transmit and the receive laser might be different, a phase noise may be introduced due to, for example, a limited quality of the lasers, the Digital to Analog Convertor (DAC) clock at the transmitter CV-QKD device 'A' 420 and the Analog to Digital Convertor (ADC) clock at the receiver CV-QKD device 'B' 430 might have a different phase and frequency. All these effects may introduce a time and/or frequency dependent phase change of the signal that might introduce loss and even noise.

Abstractly, the CV-QKD system 400 may be modelled with an ideal additive white Gaussian noise channel. This is shown for simplicity with a frequency independent channel in FIG. 5.

Figure 5:
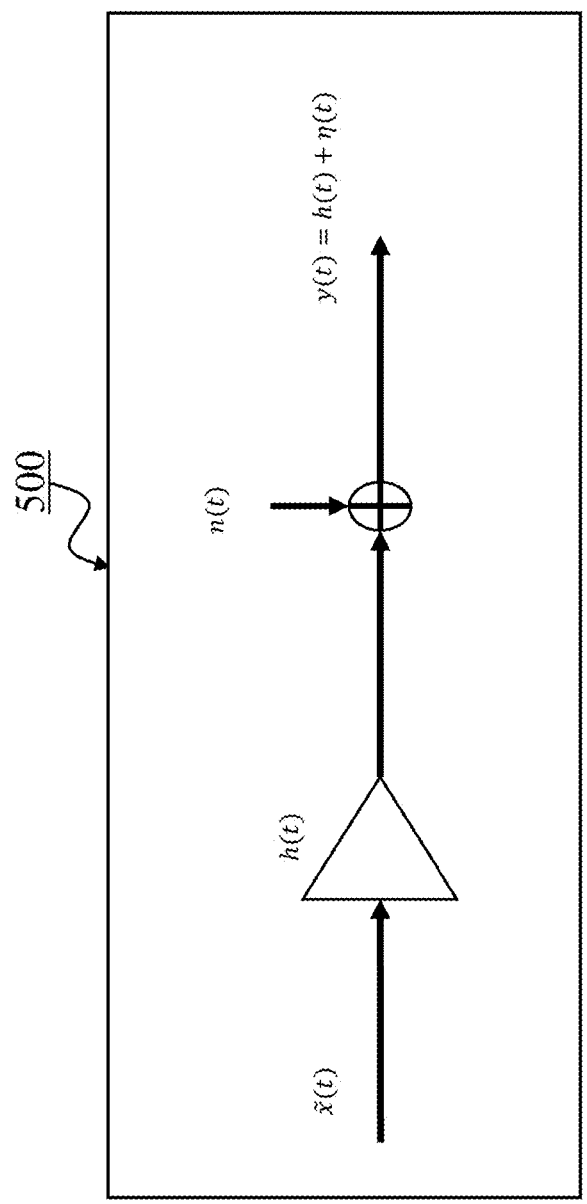
FIG. 5 is a schematic view of a diagram illustrating a base band representation of additive white Gaussian noise model with transmit signal x̃(t), time dependent channel h(t), shot noise η(t) and received signal y(t)

Reference is made to FIG. 5 which is a schematic view of a diagram 500 illustrating a base band representation of additive white Gaussian noise model with transmit signal $x(t)$, time dependent channel $h(t)$, shot noise $\eta(t)$ and received signal $y(t)$. Besides, a possible frequency dependence of the channel is dropped for simplicity.

Figure 6:
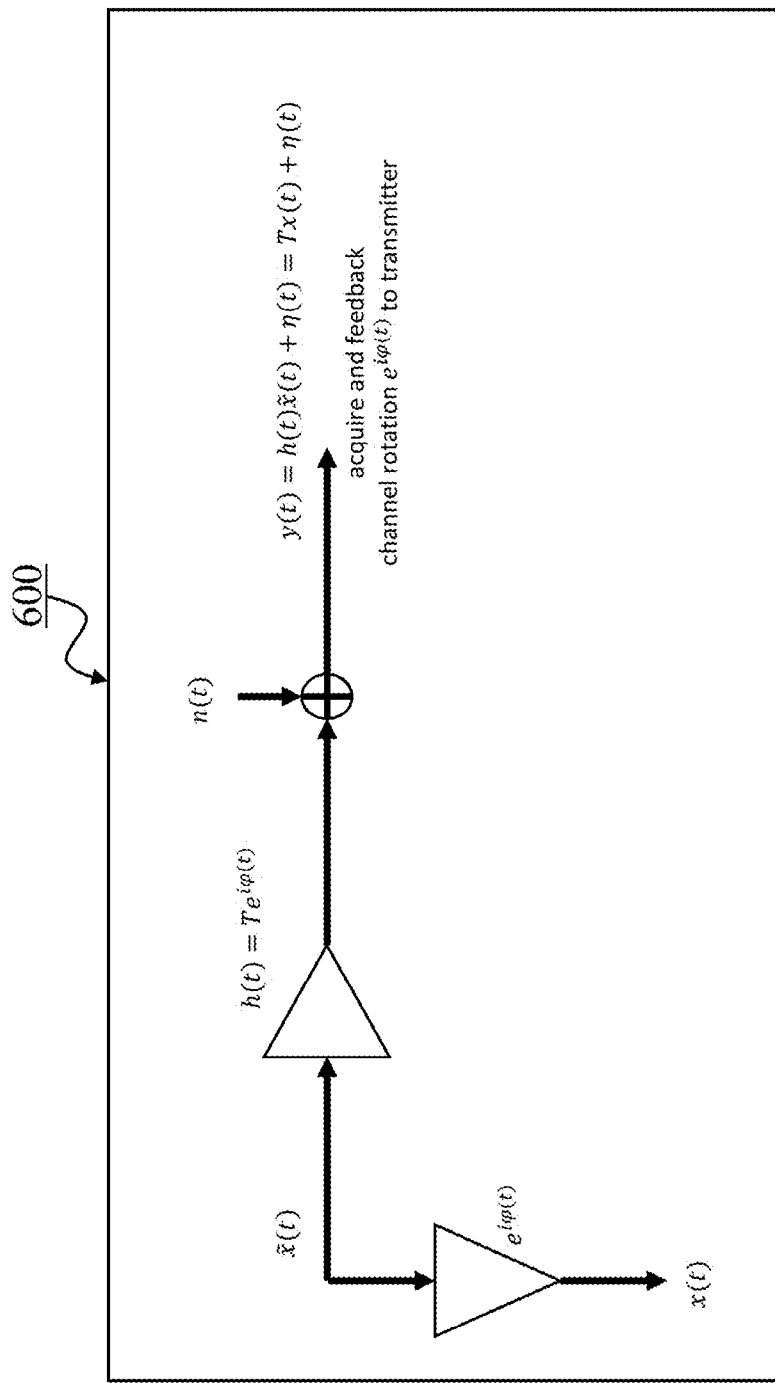
FIG. 6 is a schematic view of a diagram illustrating an extended base-band model, where the time dependent phase change $e^{-i\varphi(t)t}$ is measured at the receiver and applied at the transmitter to extract the effective transmit signal x(t)

Moreover, the effective quantum channel may be decided, for example, by the measurement and processing of the receiver CV-QKD device 'B' 430 (and/or the method 300 performed by the receiver CV-QKD device 'B' 430). The time and/or frequency dependent phase change or a part of it (constant in time, linear in time, higher order time) is measured, e.g., based on a pilot tone, another service channel, or a disclosed part of the quantum channel. This information may further communicated to the transmitter CV-QKD device 'A' 420, which can then apply the phase change and also the receiver processing to the remembered transmit signal. This step may transform the original transmit signal into the effective transmit signal, as can be seen in FIG. 6 for the frequency independent case. The effective transmit signal will then be used in the post processing for secret key generation.

Reference is made to FIG. 6 which is a schematic view of a diagram 600 illustrating an extended base-band model, where the time dependent phase change $e^{-i\varphi(t)t}$ is measured at the receiver CV-QKD device 'B' 430 and is applied at the transmitter CV-QKD device 'A' 420 to extract the effective transmit signal x(t). Additional receive processing and a possible frequency dependence is dropped for simplicity.

One of the main benefits of the techniques described herein is that they remove the need for analog phase synchronization and reduce the need for analog frequency synchronization substantially. The carrier frequency synchronization would need that the receiver CV-QKD device 'B' 430 captures some part of the transmit signal. Since the transmitter CV-QKD device 'A' 420 has access to all degrees of freedom before they are collapsed by the receiver CV-QKD device 'B' 430, this simplification is even true for single quadrature measurements (e.g., of FIG. 17a). This protocol enables the previously prohibitive implementation of FIG. 17a in a "local" local oscillator setup and, therefore, allows for a simplification of the analog signal processing stages.

One of the main difference to the conventional devices and methods is that the transmitter CV-QKD device 'A' 420 sends with an increased bandwidth. Without an increase of transmit bandwidth a constant phase error can be corrected in this way. The proposed protocol also allows to tolerate carrier frequency offsets, phase noise, sampling clock offsets and clock skew.

Figure 7:
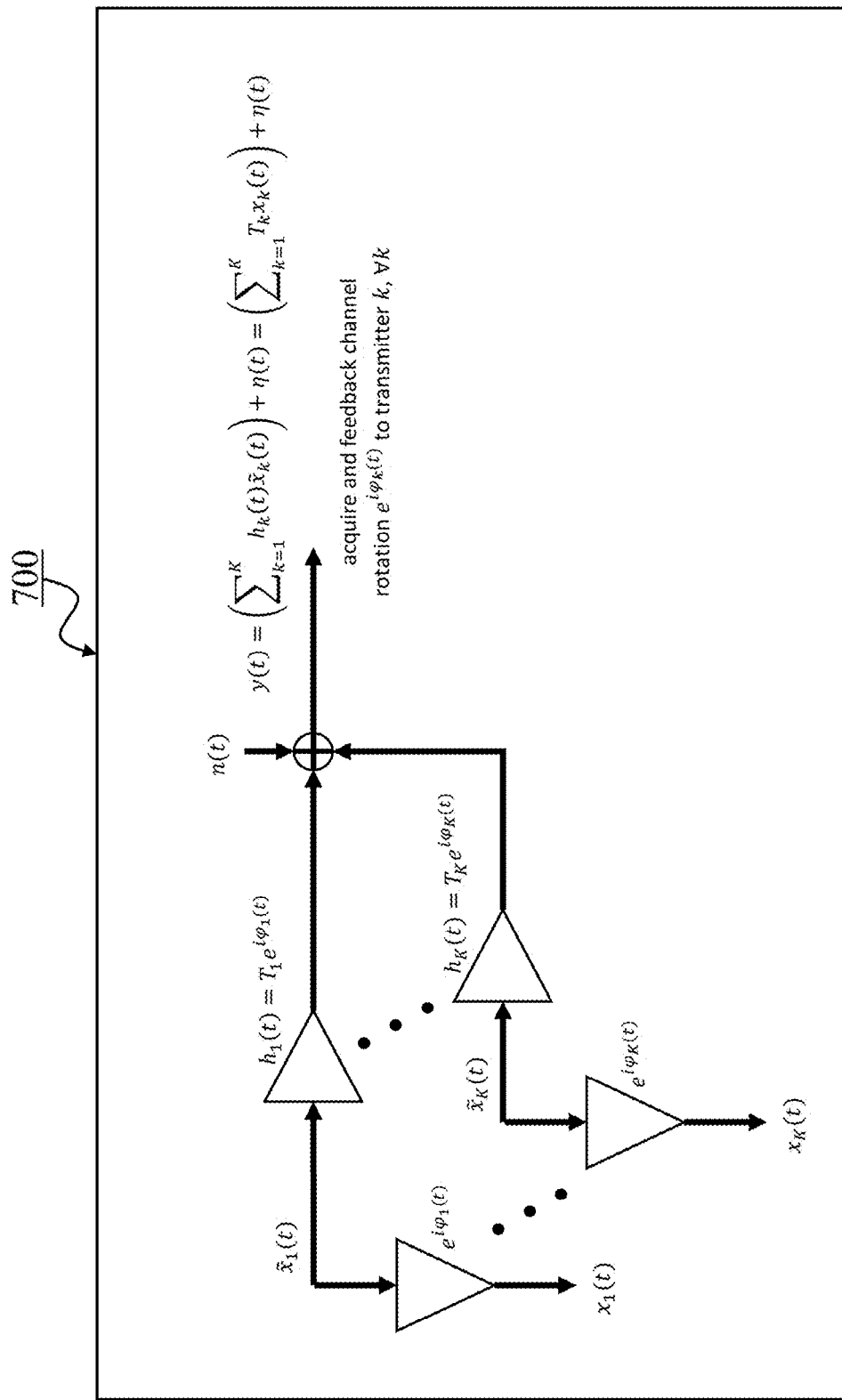
FIG. 7 is a schematic view of a diagram illustrating a synchronization of multiple CV-QKD devices.

Reference is made to FIG. 7 which is a schematic view of a diagram 700 illustrating a synchronization of multiple devices. Each transmitter CV-QKD device 'A' sends the signal $\tilde{x}_k(t)$, which then travels over the time dependent channel $h_k(t)$. All signals are measured jointly with the shot noise n(t) to retrieve the received signal y(t). All channel rotations $\varphi_k(t) \forall k$ need to be measured and communicated to the respective transmitter CV-QKD device 'A'. The transmitters CV-QKD devices 'A' can then apply the individual channel rotation to retrieve their effective transmit signal $x_k(t)$, respectively. Additional receive processing and a potential frequency dependence of the channel are omitted for simplicity.

Figure 16:
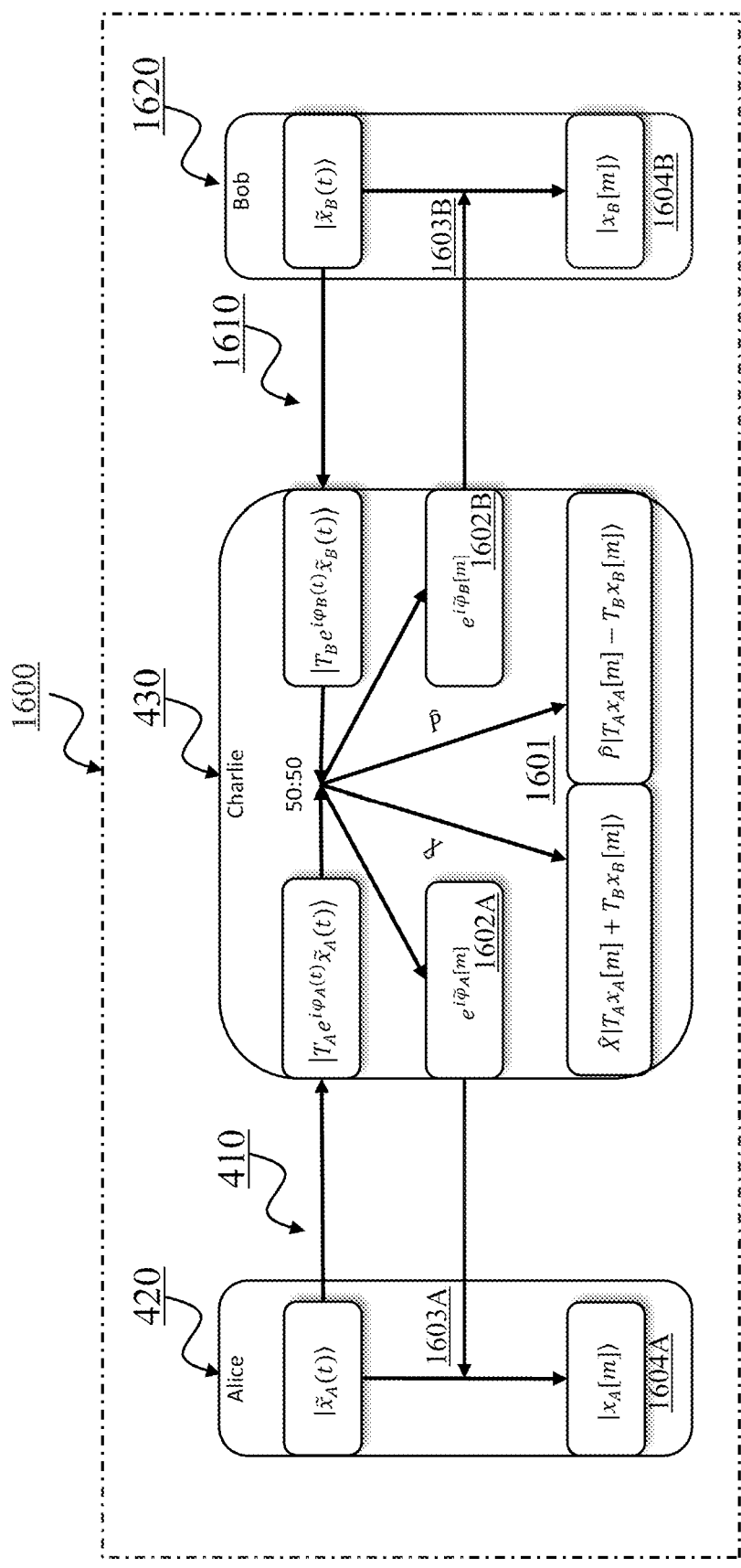
FIG. 16 is a schematic view of a diagram illustrating an adaptation of the reverse synchronization idea for MDI-CV-QKD.

This idea allows to synchronize multiple quantum key distribution devices as shown in FIG. 7 Therefore, it facilitates substantially the implementation of measurement-device-independent quantum key distribution (MDI-QKD) as shown in FIG. 16. Again, the effective transmit signals may be used for the post processing.

In the following, examples of implementations of the proposed techniques are described. The numerical values given below are mere examples and other numerical values may be used.

Figure 8B:
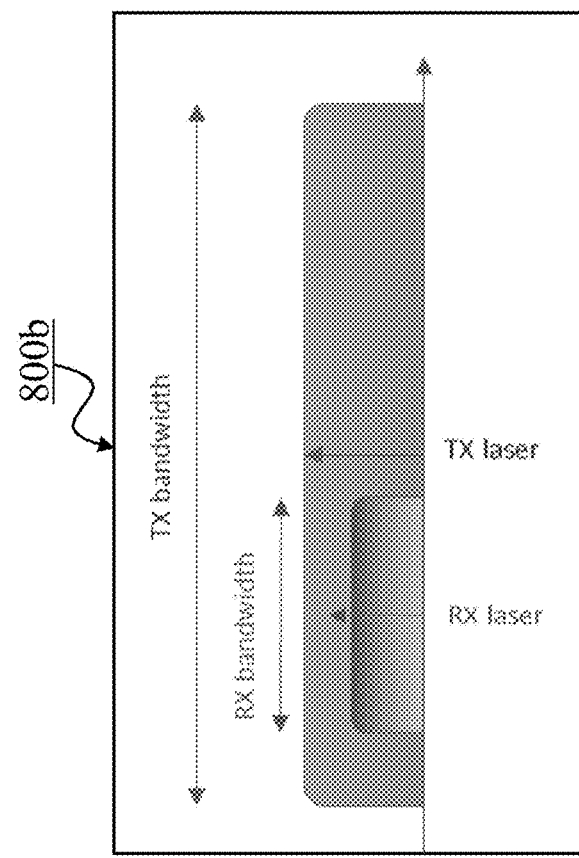
FIGS. 8a and 8b are schematic view of diagrams of potential bandwidth allocations for transmitter and receiver, where transmit and receive laser are not aligned in phase and frequency and the transmit side bandwidth is larger than the receiver bandwidth.
Figure 8A:
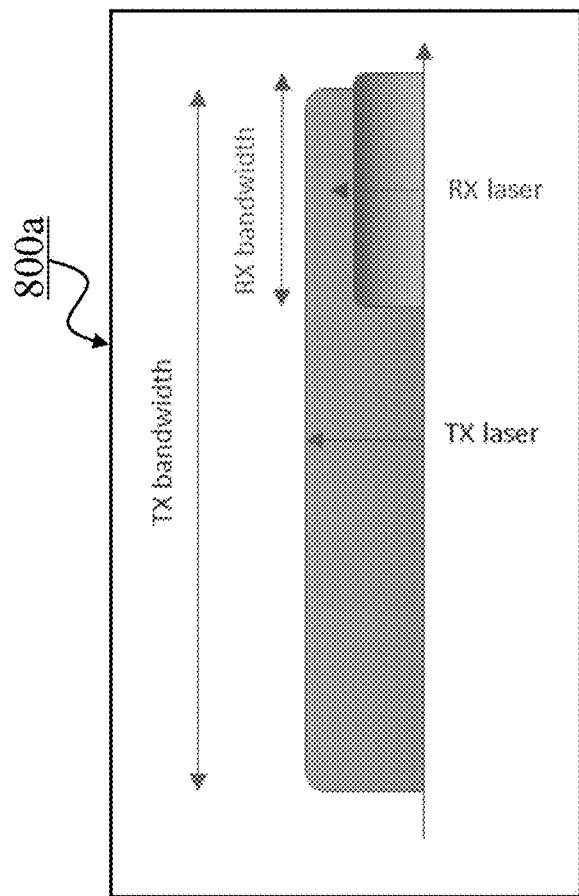

The transmit side quantum signal may be stored and transmitted as follows. For example, the complex transmit symbols $\tilde{x}[n]$, with symbol index n, are received from a higher layer or taken from a quantum random number generator. These symbols might be of any modulation that maintains its properties under any rotation and is representable with a coherent state (phase space representation) consisting of an X and P (in-phase and quadrature) component. This may be achieved, e.g., with a complex Gaussian modulation. The data may be potentially up-sampled to 200 MS/s and pulse-shaped, e.g., with a root-raised-cosine filter (β=0.35) obtaining the sequence of sample $\tilde{x}[m]$, with sample index m. A possible channel allocation is shown in FIG. 8a and FIG. 8b.

The transmit side analog processing of the transmitter CV-QKD device 'A' 420 may be performed as follow.

For example, the transmitter CV-QKD device 'A' 420 (e.g., the transmit hardware depicted in FIG. 17d) may operate with a continuous-wave laser. The pulse shaping was potentially already done in the digital domain. An analog low-pass filter at the output of the digital-to-analog conversion (DAC) suppresses the digital aliasing fragments. The combination of the digital and analog low-pass filters assures that the signal power is concentrated in the bandwidth of the transmission. The analog signal is then modulated onto the optical carrier.

Furthermore, the modulator is fed with a laser of 11 dBm output power at 1550 nm. As it can be derived from FIG. 17d, the output of the modulator may be attenuated with a variable attenuator. Moreover, before the signal leaves the transmitter CV-QKD device 'A' 420, it may split with a 20 dB coupler. The strong arm, almost all of the power, may be observed with a power meter, while the weak arm may be sent to the receiver CV-QKD device 13' 430.

In the following, the sequence of coherent states derived from $\tilde{x}[m]$ and emitted by the transmitter CV-QKD device 'A' 420 is classically referred to by $\tilde{x}(t) \in \mathbb{C}$ in base band. The real part is associated with the in-phase component (cos) of the optical field, while the imaginary part is associated with the quadrature component (−sin) of the optical field. The Fourier transform description of the field is according to Eq. (1):

$$\int_{\omega_{TX}-B_{TX}/2}^{\omega_{TX}+B_{TX}/2} \mathcal{R}\{\tilde{x}(\omega)e^{i\omega t}\}d\omega = \quad \text{Eq. (1)}$$

$$\int_{0}^{B_{TX}/2} \mathcal{R}\{\tilde{x}(\omega_{TX}+\omega)e^{i(\omega_{TX}+\omega)t} + \tilde{x}(\omega_{TX}-\omega)e^{i(\omega_{TX}-\omega)t}\}d\omega,$$

where $B_{TX}$ and $\omega_{TX}$ are complex bandwidth and carrier frequency, respectively, and $\tilde{x}(\omega) \in \mathbb{C}$ is the frequency domain representation of the up-converted $\tilde{x}(t)$, $$\tilde{x}(\omega) = \int_{-\infty}^{\infty} \tilde{x}(t)e^{i(\omega_{TX}-\omega)t}dt.$$

For individual offset frequencies co, the in-phase and quadrature components with respect to the transmit laser may be given according to following equations:

$$\frac{1}{2}(\tilde{x}(\omega_{TX}+\omega) + \tilde{x}^*(\omega_{TX}-\omega)) = \quad \text{Eq. (2)}$$

$$\frac{1}{2}\int_{-\infty}^{\infty} \tilde{x}(t)e^{-i\omega t} + \tilde{x}^*(t)e^{-i\omega t}dt = \int_{-\infty}^{\infty} \mathcal{R}\{\tilde{x}(t)\}e^{-i\omega t}dt \text{ and}$$

-continued $$\frac{1}{2}(\tilde{x}(\omega_{TX}+\omega)-\tilde{x}^*(\omega_{TX}-\omega))=$$  Eq. (3)

$$\frac{1}{2}\int_{-\infty}^{\infty}\tilde{x}(t)e^{-i\omega t}-\tilde{x}^*(t)e^{-i\omega t}dt=\int_{-\infty}^{\infty}\mathcal{J}\{\tilde{x}(t)\}e^{-i\omega t}dt,$$

respectively.

Quantum mechanically the transmit state may be expressed by Eq. (4) as follows:

$$|\tilde{x}(t)\rangle=\otimes_{\omega_{TX}-B_{TX}/2}^{\omega_{TX}+B_{TX}/2}|\tilde{x}_\omega(t)\rangle\,d\omega=$$

$$\otimes_0^{B_{TX}/2}|\tilde{x}_{\omega_{TX}+\omega}(t)\rangle\,|\tilde{x}_{\omega_{TX}-\omega}(t)\rangle\,d\omega$$  Eq. (4)

where $\otimes_{\omega_1}^{\omega_2}|x(\omega)\rangle d\omega$ is the tensor product of all modes $|x(\omega)\rangle$ for continuous $\omega$ between $\omega_1$ and $\omega_2$. The cumbersome notation is due to the multi-mode system with finite bandwidth. All modes outside of the bandwidth are assumed to be in vacuum state.

Moreover, the quantum communication channel 410 may be determined, for example, for a limited bandwidth and power, it may be assumed that the actual channel between the digital domain of the transmitter CV-QKD device 'A' 420 and the digital domain of the receiver CV-QKD device 'B' 430 can be modelled as an additive white Gaussian noise channel (as shown in FIG. 5). The quantum communication channel 410 has a time-dependent, single-tap coefficient $h(t)=T(t)e^{i\varphi(t)}$, which introduces loss T and a potential phase change $\varphi(t)$, and a time-dependent, additive coefficient that introduces noise $\eta(t)$.

The loss originates from the transmission medium, e.g., the optical fiber. Additional loss might originate from imperfect receiver hardware like the insertion loss of the optical components in the receiver CV-QKD device 'B' 430 and/or a realistic quantum efficiency of the detector. With a finite accuracy of the transmit power measurement, in some embodiments of the application, it may be possible to add an additional loss by assuming the worst case transmit power.

For instance, a constant phase change may be introduced by the transmitter CV-QKD device 'A' 420 and the receiver CV-QKD device 'B' 430 side carriers not synchronized in phase. Furthermore, a phase change linear in time may be introduced by the transmitter CV-QKD device 'A' 420 and the receiver CV-QKD device 'B' 430 side carriers not synchronized in frequency. Also, a non-linear phase change might be introduced by phase noise.

The power of the added noise is lower bounded by the uncertainty principle to the power of shot noise. Noise on top of the shot noise may be introduced by imperfect hardware of the transmitter CV-QKD device 'A' 420 and/or the receiver CV-QKD device 'B' 430, e.g., finite resolution of the ADC/DAC and/or electronic noise of the detector. Additional noise may also originate from optical amplifiers, non-linear effects in the fiber like Raman emissions, and an eavesdropping attack.

Figure 9:
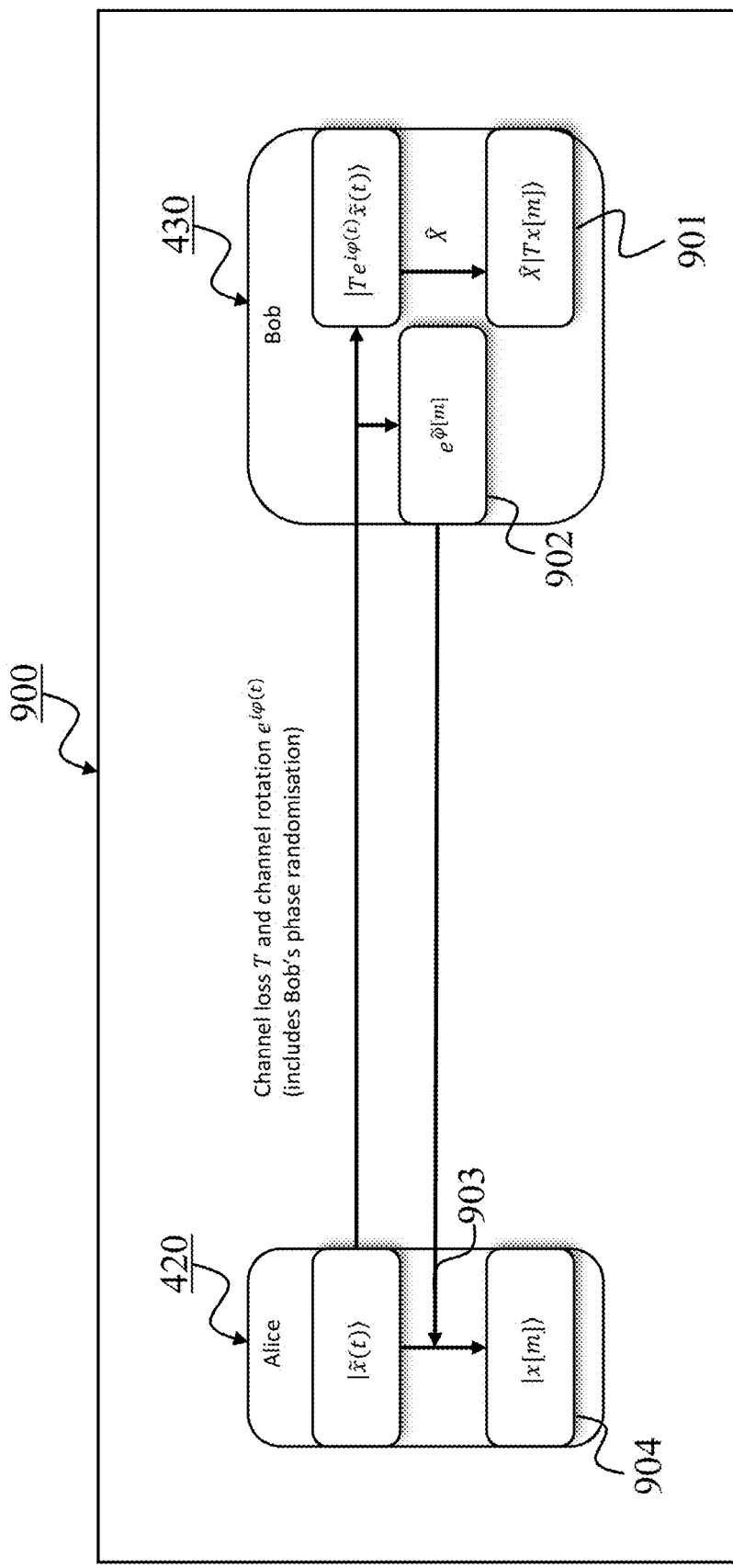
FIG. 9 is a schematic view of a diagram illustrating reverse synchronization.

The operation of the quantum communication channel 410 may be described classically in the equivalent base-band model as is illustrated in diagram 500 of FIG. 5, according to Eq. (5):

$$y(t)=Te^{i\varphi(t)}\tilde{x}(t)+\eta(t)=Tx(t)+\eta(t)\in\mathbb{C}$$  Eq. (5)

and upon the optical field based on the Fourier transform, it may be derived according to Eq. (6):

$$\int_0^\infty \mathfrak{R}\{(Tx(\omega)+\eta(\omega))e^{i\omega t}\}d\omega=\int_0^\infty \mathfrak{R}\{(Te^{i\varphi(t)}\tilde{x}(\omega)+\eta(\omega))e^{i\omega t}\}d\omega,$$  Eq. (6)

where the bandwidth limitation of the transmitter CV-QKD device 'A' 420 has to be dropped. Quantum mechanically it can be described under the assumption that there is shot noise in the system, according to Eq. (7)

$$|Tx(t)\rangle=\otimes_0^\infty|Tx_\omega(t)\rangle d\omega=\otimes_0^\infty|Te^{i\varphi(t)}\tilde{x}_\omega(t)\rangle$$

$$d\omega=|Te^{i\varphi(t)}\tilde{x}(t)\rangle,$$  Eq. (7)

where the received state may be referred as $|Tx(t)\rangle=\otimes_0^\infty|Tx_\omega(t)\rangle d\omega$. This is also depicted in FIG. 9.

Furthermore, the receiver side analog processing may be performed, e.g., by the receiver CV-QKD device 'B' 430. For instance, after the signal propagated over the quantum communication channel 410, a single quadrature detection (for example, according to FIG. 17*a*) may be performed, but, the receiver laser is not aligned in phase or frequency with the transmit side laser. It is assured that the receiver CV-QKD device 'B' 430 detects some part of the transmit signal. An example of the bandwidth allocation is shown in FIG. 8*a* and FIG. 8*b*.

Reference is made to FIG. 8*a* and FIG. 8*b* which are schematic view of two diagrams 800*a* and 800*b* illustrate potential bandwidth allocations for the transmitter CV-QKD device 'A' 420 and the receiver CV-QKD device 'B' 430, where the transmit and the receive laser are not aligned in phase and frequency and the transmit side bandwidth is larger than the receiver bandwidth. The two FIG. 8*a* and FIG. 8*b* differ in the momentary realization of acceptable frequency differences between transmitter CV-QKD device 'A' 420 and receiver CV-QKD device 'B' 430. The receiver CV-QKD device 'B' 430 would need to capture some part of the transmit signal. The frequency difference stems, e.g., from the properties of free running lasers and might change quickly over time.

The operation may be described as a down-conversion combined with a bandwidth limitation. Without loss of generality the phase of the receiver side laser is set to zero. Based on the Fourier transform description of the optical field, the in-phase measurement can be written classically according to Eq. (8):

$$\frac{1}{2}\int_{\omega_{RX}-\frac{B_{RX}}{2}}^{\omega_{RX}+\frac{B_{RX}}{2}}\mathfrak{R}\{(Tx(\omega)+n(\omega))e^{i(\omega-\omega_{RX})t}\}d\omega=$$  Eq. (8)

$$\frac{1}{2}\int_0^{\frac{B_{RX}}{2}}\mathfrak{R}\{(Tx(\omega_{RX}+\omega)+Tx^*(\omega_{RX}-\omega)+$$

$$\eta(\omega_{RX}+\omega)+\eta^*(\omega_{RX}-\omega))e^{i\omega t}\}d\omega=$$

$$\mathfrak{R}\left\{\int_0^{B_{RX}/2}\int_{-\infty}^\infty \mathfrak{R}\{Tx(\tau)+\eta(\tau)\}e^{i\omega(t-\tau)}d\tau\,d\omega\right\}=$$

$$\mathfrak{R}\{Tx(t)+\eta(t)\},$$

where the relevant signal Tx(t)+n(t) is assumed to be within the bandwidth of the receiver CV-QKD device 'B' 430. Note that, the in-phase component is here referred to the receiver CV-QKD device 'B' 430 and not the transmitter CV-QKD device 'A' 420 or the quantum communication channel 410. The down-converted signal and the interpretation of in-phase and quadrature component may depend on the receiver side laser frequency, for example:

$$\frac{1}{2}(Tx_{\omega_{RX}}(\omega_{RX}+\omega) + Tx^*_{\omega_{RX}}(\omega_{RX}-\omega) + \eta_{\omega_{RX}}(\omega_{RX}+\omega) +$$

$$\eta^*_{\omega_{RX}}(\omega_{RX}-\omega)) = \int_{-\infty}^{\infty} \Re\{Tx_{\omega_{RX}}(t) + \eta_{\omega_{RX}}(t)\}e^{-i\omega t}d$$

Eq. (9)

and $$\frac{1}{2}(Tx_{\omega_{RX}}(\omega_{RX}+\omega) - Tx^*_{\omega_{RX}}(\omega_{RX}-\omega) + \eta_{\omega_{RX}}(\omega_{RX}+\omega) -$$

$$\eta^*_{\omega_{RX}}(\omega_{RX}-\omega)) = \int_{-\infty}^{\infty} \Im\{Tx_{\omega_{RX}}(t) + \eta_{\omega_{RX}}(t)\}e^{-i\omega t}dt.$$

Eq. (10)

Equivalently, in some embodiments of the application, the dimensionality reduction may be due to the fact that components with higher frequencies than the receiver side laser are irreversibly combined with components with smaller frequencies than the receiver side laser. The quantum mechanical operation can be described, according to Eq. (11):

$$\hat{X} \mid Tx(t) = \left(\frac{1}{2}\int_0^{B_{RX}/2} \hat{X}_{\omega_{RX}+\omega} + \hat{X}^H_{\omega_{RX}-\omega} d\omega\right)$$

Eq. (11)

$$(\bigotimes_0^{B_{RX}/2} \mid Tx_{\omega_{RX}+\omega}(t) \mid Tx_{\omega_{RX}-\omega}(t)d\omega),$$

where the $\hat{X}^\omega$ is the measurement operator for the in-phase component of mode $\omega$ and the superscript $(\cdot)^H$ denotes conjugate transpose. The measurement operators may further be combined according to Eq. (12):

$$\hat{X} = \frac{1}{2}\int_0^{B_{RX}/2} \hat{X}_{\omega_{RX}+\omega} + \hat{X}^H_{\omega_{RX}-\omega} d\omega.$$

Eq. (12)

This measurements may project the two dimensional optical field onto the phase selected by the receiver CV-QKD device 'B' 430. Furthermore, if the receiver is aligned perfectly in phase and frequency with the transmitter CV-QKD device 'A' 420, which is a difficult task that has to be performed in the analog domain, it has access to the transmitted in-phase component. If the receiver CV-QKD device 'B' 430 is not aligned perfectly in phase and frequency with the transmitter CV-QKD device 'A' 420 it has access to some superposition of in-phase and quadrature component. Forcing the receiver CV-QKD device 'B' 430 to choose between one of the two component given by the transmitter CV-QKD device 'A' 420 may potentially reduce the signal quality significantly. Furthermore, since the transmitter CV-QKD device 'A' 420 still has knowledge about its transmit signal and, therefore, both degrees of freedom, it does not suffer from letting the receiver CV-QKD device 'B' 430 determine what is mean by in-phase component.

The local oscillator has an output power of 7 dBm and the signal is detected with a balanced detector where the ratio of the shot noise with respect to the electronic noise exceeds 20 dB. It may be confirmed with online measurements of the excess noise that this is the dominant noise source on top of the shot noise in the CV-QKD system. The amplified output of the balanced detector is DC blocked, low passed filtered, and subsequently converted with a sampling rate of 200 MS/s into digital signals.

Moreover, the receiver side quantum channel processing may be performed. For example, after the digitization, one of the first steps in the digital processing may be the shot noise normalization, where the data is normalized to the root-mean-squared value of shot noise. Here, this is done in the frequency domain for each frequency bin individually in a windowed overlap-and-save procedure. The normalization values may be timely calculated during calibration routines, which may be continuously interleaved with data reception (for example, 10 s of calibration, 10 s of reception in a loop implemented with optical switches, etc.). The samples may be obtained using Eq. (13) as follow:

$$\Re \{Tx[m] + \eta[m]\}$$

Eq. (13)

where the samples are obtained with sample index m. On top of the analog bandwidth limitation of the receiver equipment, the receiver CV-QKD device 'B' 430 may apply digital filtering operations, like a root-raised-cosine filter and/or a downconversion, in order to extract the measurement of the effective quantum channel. This may be represented with the convolution of the estimate with a filter g [m] and a subsequent down-sampling using Eq. (14) as follow:

$$\Re \{Tx[n] + \eta[n]\} = (\Re \{Tx[m] + \eta[m]\} * g[m])[n],$$

Eq. (14)

with the symbol index n. The recovered symbols may be handed over to the post-processing stage at the receiver side (for example, step 901 in FIG. 9).

Additionally, the receiver side phase noise, carrier frequency offset, constant phase, may be estimated, for example, somehow, the time dependent phase change of the channel φ(t) may be estimated from the received signal obtaining the digital estimates φ̂[m] (for example, step 902 in FIG. 9).

As discussed, the transmit side signal may be recovered, for example, the receiver side estimated time dependent phase change φ̂[m] introduced by the quantum communication channel 410 (including the receiver CV-QKD device '13' 430 and the transmitter CV-QKD device 'A' 420 hardware) is communicated to the transmitter CV-QKD device 'A' 420 (e.g., step 903 in FIG. 9). This phase change may comprise all information about constant phase changes, carrier frequency offset, and/or phase noise. The time dependent phase change φ̂[m], and the receiver side quantum channel processing g [m] (e.g., root-raised-cosine filter) are now applied to the previously transmitted and remembered signal x̃[m], as follow:

$$\Re \{x[n]\} = (\Re \{\tilde{x}[m]e^{\varphi[m]}\} * g[m])[n]$$

Eq. (15)

Furthermore, the signal $\Re$ {x[n]} extracted in this way from the original transmit signal is now aligned in phase and frequency to the receiver side measurement $\Re$ {Tx[n]+ η[n]}. Afterwards, the $\Re$ {x[n]} is handed over to the post-processing at the transmitter side (e.g., step 904 in FIG. 9). In this step it is assumed that the sample clocks at transmitter CV-QKD device 'A' 420 and receiver CV-QKD device 'B' 430 are perfectly aligned.

Reference is made to FIG. 9 which is a diagram 900 of the reverse synchronization. The transmitted states are disturbed in amplitude and phase by the quantum communication channel 410, which includes the transmitter CV-QKD device 'A' 420 and receiver CV-QKD device 'B' 430 hardware and potential phase/frequency randomizations by the receiver CV-QKD device 'B' 430.

At step 901, the receiver CV-QKD device 'B' 430 performs a single quadrature measurement, obtaining the in-phase component relative to the receiver side laser. This information is regarded as the effective quantum channel measurement.

At step 902, the receiver CV-QKD device 'B' 430 additionally estimates the time dependent phase change introduced by the channel and at step 903 communicates this information to the transmitter CV-QKD device 'A' 420.

At step 904, the transmitter CV-QKD device 'A' 420 applies this time dependent phase change to the previously transmitted and remembered signal to obtain the effective quantum signal at the transmit side.

The quantum communication channel 410 parameters may be estimated, for example, from a signal processing point of view, the key performance indicator of the setup is the noise on top of the shot noise, which has a severe impact on the final key rate. The dominant noise may be the electronic noise of the receiver side amplifiers. This noise source might be trusted under certain security assumptions and, therefore, can be disregarded. The remaining noise on top of the shot noise can be estimated by subtracting the root-mean-squared values of the calibrated shot noise, the calibrated electronic noise and the recovered signal from the total root-mean-squared value in the quantum channel. Expressing this value normalized to the root-mean-squared value of the shot noise is the typical figure of merit for the CV-QKD systems.

Moreover, a multi-tap channel may be used, for example, with a frequency selective channel, the quantum communication channel 410 becomes a time dependent convolution. The time and frequency dependent channel has to be estimated, communicated to the transmitter CV-QKD device 'A' 420, and applied at the transmitter CV-QKD device 'A' 420. The frequency and time dependency allows to model effects like phase and frequency misalignments in the DAC and ADC clocks. For instance, a fractional delay that is caused by the ADC sampling not hitting the received symbols at the optimal times, will show up as a frequency selective phase change that is linear in frequency. Moreover, it may be possible to synchronize the transmitter CV-QKD device 'A' 420 and receiver CV-QKD device 'B' 430 additionally under such impairments. The optimal sampling time is decided by the receiver CV-QKD device 'B' 430 and the transmitter CV-QKD device 'A' 420 has to follow this decision by applying the frequency and time dependent phase change.

Furthermore, the phase and/or the frequency may be randomized, (for example, with an additional phase and/or frequency randomization of the receiver side laser for security reasons), this can be included in the estimated, time-dependent phase change communicated to the transmitter.

Additionally, the bandwidth allocations and the receiver structures may be based on a dual quadrature detection, an up-converting transmitter, a heterodyne detection, etc.

Figure 17C:
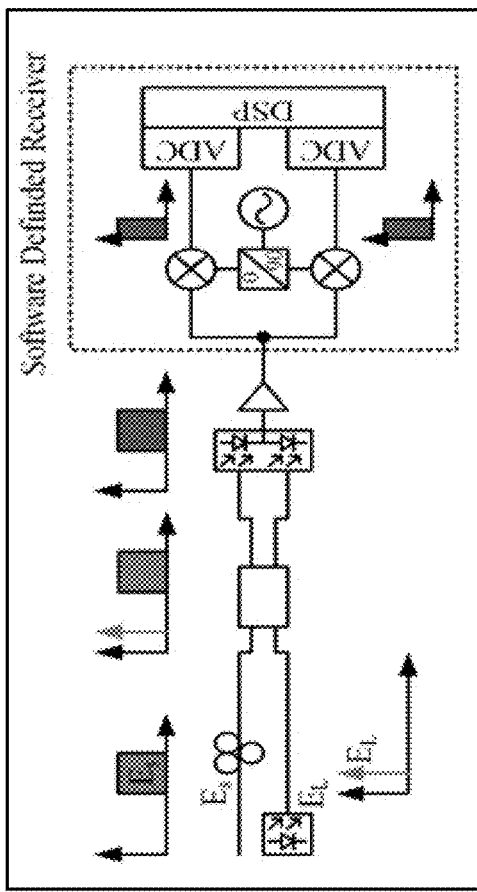
FIGS. 17a, b, c and d are schematic views of conventional software defined transmitter and different detector implementation possibilities.
Figure 17D:
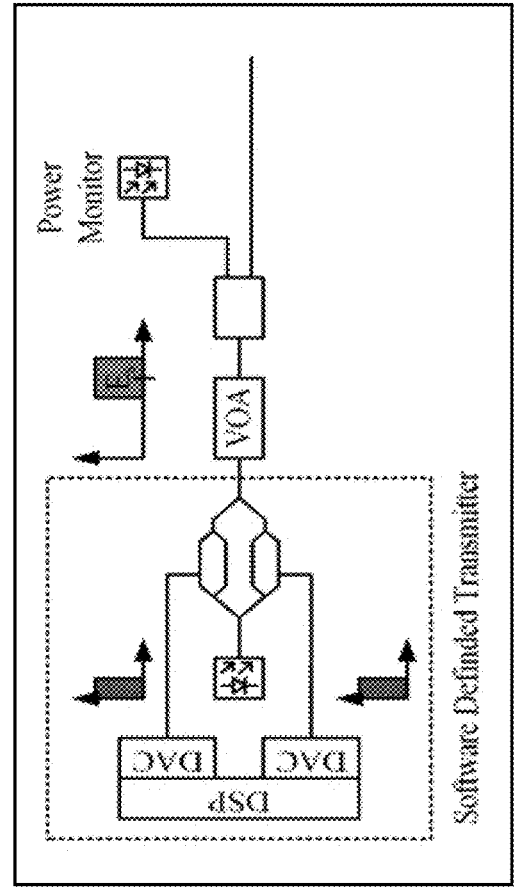
Figure 17A:
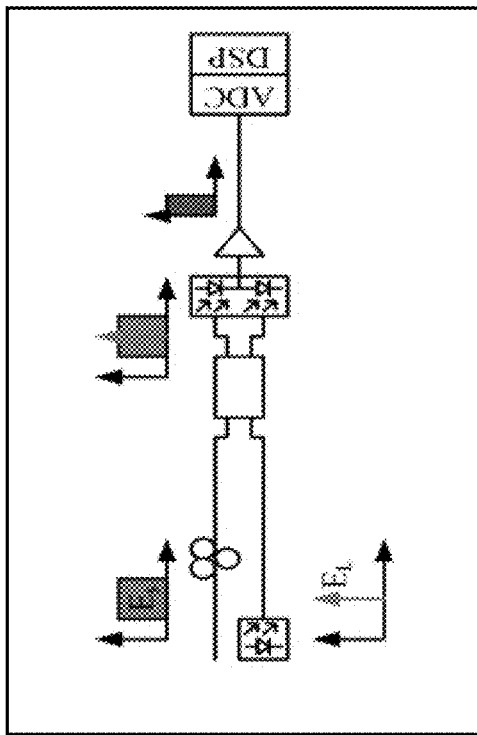
Figure 17B:
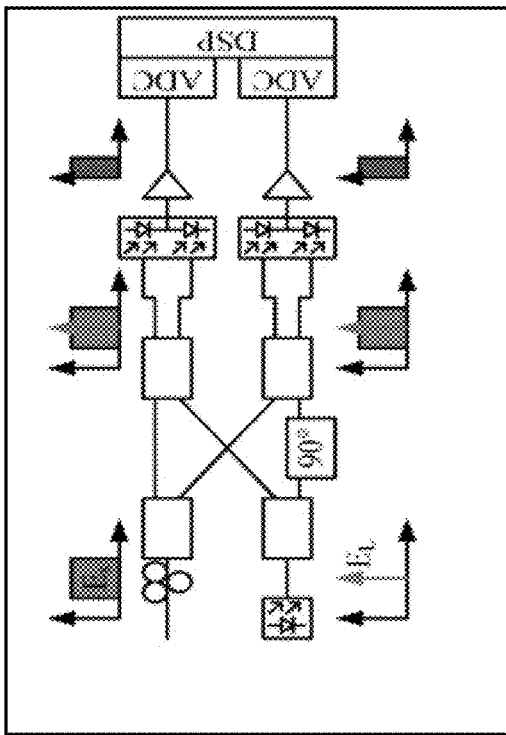

In a dual quadrature detection (for example, with a dual quadrature detection as it is described in FIG. 17*b*) without locking phase and a limited requirement on frequency locking, the receiver CV-QKD device 'B' 430 may detect some part of the transmit signal.

In an up-converting transmitter, (for example, with an electrical and/or digital up-conversion step at the transmitter before the optical modulation), the electrical up-conversion would need four DAC signals feeding two up-converters, which then feed the two inputs of the modulator. This has the advantage that flicker noise of the transmitter CV-QKD device 'A' 420 and an imperfect DC suppression do not introduce excess noise. A possible bandwidth configuration can be seen in FIG. 10.

In a heterodyne detection, (for example, with a digital and/or electrical down-conversion at the receiver side), the electrical down-conversion may be depicted similar to in FIG. 17*c*. The intermediate frequency may be either fixed or randomly chosen. This setup has the advantage that flicker noise of the receiver does not introduce excess noise. A possible bandwidth allocation can be seen in FIG. 10.

Figure 10:
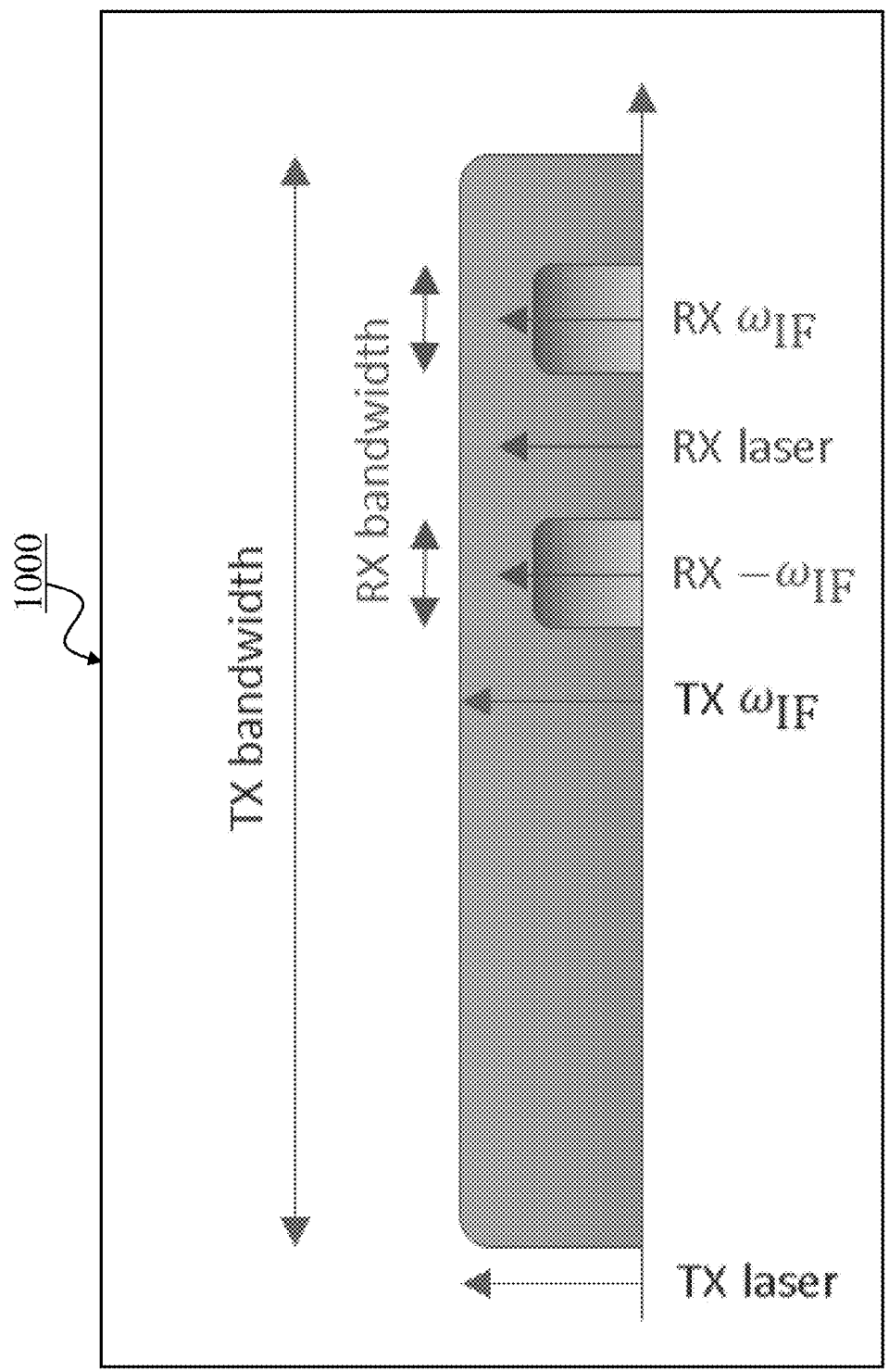
FIG. 10 is a schematic view of a diagram illustrating a potential bandwidth allocation for transmitter and receiver, where transmit and receive laser are not aligned in phase and frequency and the transmit side bandwidth is larger than the receiver bandwidth.

Reference is made to FIG. 10 which is a schematic view of a diagram 1000 for a potential bandwidth allocation for the transmitter CV-QKD device 'A' 420 and receiver CV-QKD device 'B' 430, where the transmit and the receive laser are not aligned in phase and frequency and the transmit side bandwidth is larger than the receiver bandwidth. Note that the frequency difference between transmit and receive side laser is exemplary and might change over time. The transmit signal is upconverted to a single-side-band signal with an intermediate frequency (TX $\omega_{IF}$). The receiver side signal is down-converted from an intermediate frequency (RX$\pm\omega_{IF}$), as shown, e.g., with the setup in FIG. 17*c*). It is important to note that some part of the high bandwidth transmit signal also falls into the mirror band of the receiver CV-QKD device 'B' 430. The receiver CV-QKD device 'B' 430 would need to capture some part of the transmit signal. The intermediate frequency at the receiver CV-QKD device 'B' 430 might be set as fixed or changing over time. It can be predefined, adaptive, or even randomly chosen.

Figure 11:
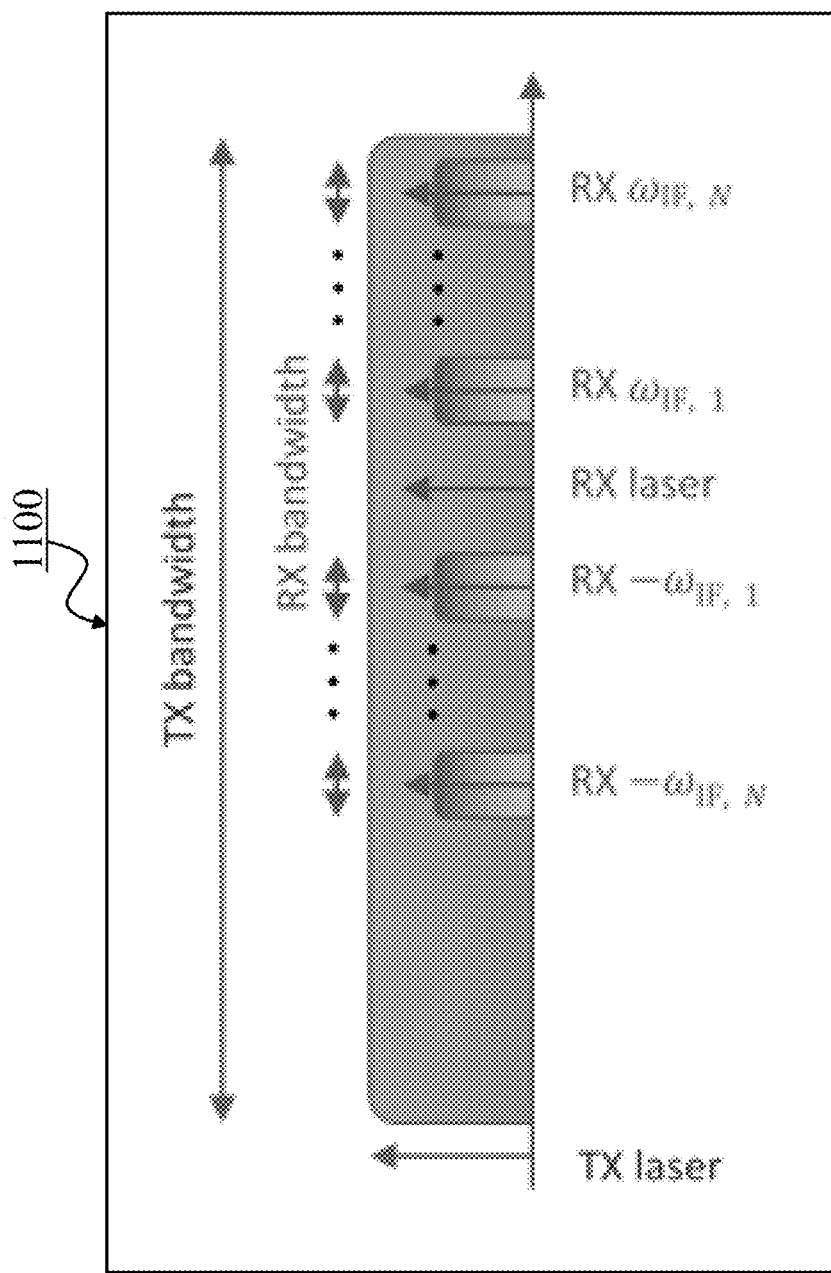
FIG. 11 is a schematic view of a diagram illustrating a potential bandwidth allocation with multiple quantum bands.

Reference is made to FIG. 11 which is a schematic view of a diagram 1100 of a potential bandwidth allocation with multiple quantum bands. Each band has its own intermediate frequency $\omega_{IF,k}$ at the receiver CV-QKD device 'B' 430. For each band there is a mirror band k at $-\omega_{IF,k}$ seen from the receiver CV-QKD device 'B' 430. In the measurement, each band and mirror band pair ($\omega_{IF,k}, -\omega_{IF,k}$) may collapse into a single result. The frequency difference between transmit and receive side laser is exemplary and might change over time. The individual intermediate frequency at the receiver CV-QKD device 'B' 430 might be set as fixed or changing over time. They can be predefined, adaptive, or even randomly chosen as long as they don't overlap.

In the heterodyne detection with multiple quantum bands as shown in FIG. 11, each band has its own intermediate frequency. The transmitter CV-QKD device 'A' 420 can be up-converting or not.

Figures 12A, 12B:
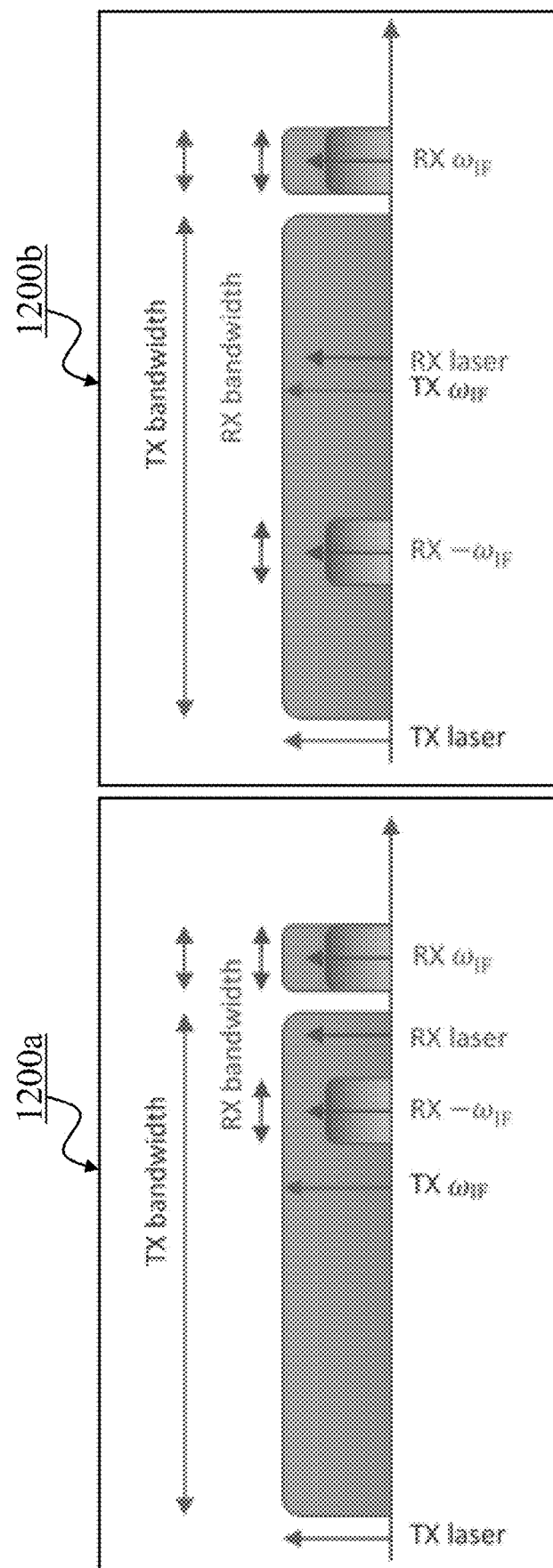
FIGS. 12a and 12b is a schematic view of diagrams illustrating potential bandwidth allocations, where one side band is fixed.

Reference is made to FIG. 12*a* and FIG. 12*b* which is a schematic view of diagrams 1200*a* and 1200*b* of potential bandwidth allocations, where one side band is fixed. Since transmit and receive laser are not locked in phase or frequency, the receiver CV-QKD device 'B' 430 needs to operate with a continuously adapting intermediate frequency to capture the fixed side band. FIG. 12*a* and FIG. 12*b* differ in the momentary frequency difference between transmit and receive laser and the adaptively chosen intermediate frequency at the receiver CV-QKD device 'B' 430. Bandwidth of transmitter CV-QKD device 'A' 420 and the receiver CV-QKD device 'B' 430 are matched for the fixed side band. The transmitter CV-QKD device 'A' 420 additionally sends a large bandwidth signal that falls into the mirror band, the other side band, of the receiver CV-QKD device 'B' 430. Here, for example, the receiver CV-QKD device 'B' 430 is able to capture the fixed side band and the wider band in such a way, that they mix in the downconversion.

Moreover, when one side band is fixed, for example, in a system with an up-converting transmitter and a heterodyne detection, where the transmitter CV-QKD device 'A' 420*s* ends two quantum bands. One with exactly the receiver CV-QKD device 'B' 430 bandwidth on one side of the receiver side laser and one much broader than the receiver bandwidth on the other side of the receiver side laser. The intermediate frequency is decided by the receiver CV-QKD device 'B' 430 in such a way, that the fixed side band (or a part of it) is captured. An example, for this can be seen in FIG. 12*a* and FIG. 12*b* in which this is closely related to the measurement setup in FIG. 17c, but now the mirror band is also occupied with signal for a wide range of intermediate frequencies.

Figure 13:
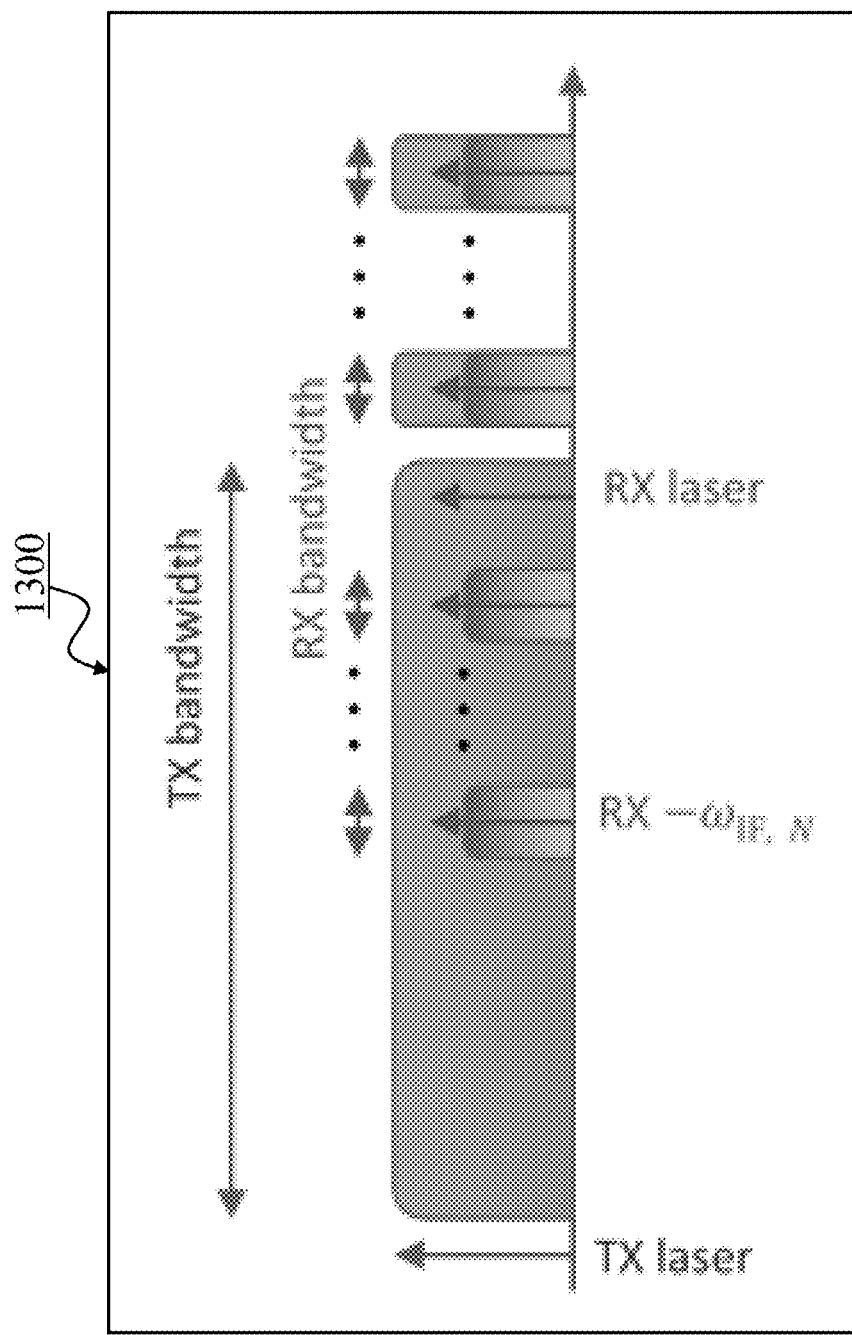
FIG. 13 is another schematic view of a diagram illustrating a potential bandwidth allocation with multiple quantum bands.

In some embodiments of the application may be based on a multiband structure with one side fixed, for example such as the multiple fixed quantum bands as it is shown in FIG. 13.

Reference is made to FIG. 13 which is a schematic view of a diagram 1300 of potential bandwidth allocation with multiple quantum bands. This is a combination of the allocations in FIG. 11 and FIG. 12.

For example, it may be possible to use an orthogonal frequency division multiplexing. For example, it is possible to utilize OFDM for multiplexing and de-multiplexing the quantum channel(s). Some sub-channels would be allocated with quantum signal and some sub-channels will remain empty to guard the quantum signal.

Moreover, the phase change may be estimated, as it is described in following in which, the multiband structure with one side fixed is used. It is also possible to keep the intermediate frequency of the quantum band(s) arbitrary, while the intermediate frequency of the synchronization channel(s) needs to be adapted to the transmit signal.

Furthermore, for the pilot tones, as typically done in "local"-local-oscillator CV-QKD implementations, higher-power pilot tone(s) might be multiplexed in frequency with the quantum channel(s) to estimate time dependent phase changes like carrier frequency offset and phase noise. In the case of multiple pilot tones it is also possible to estimate frequency dependent phase changes (e.g., as shown in FIG. 14).

The pilot tone, which typically has a high SNR, is filtered out with a Wiener filter that is continuously adapted according to the estimated power spectral density (PSD) around the pilot tone frequency. In time domain, the filtered pilot tone is compared to an ideal pilot tone. The found error is used as phase noise and carrier frequency offset estimate.

Figure 14:
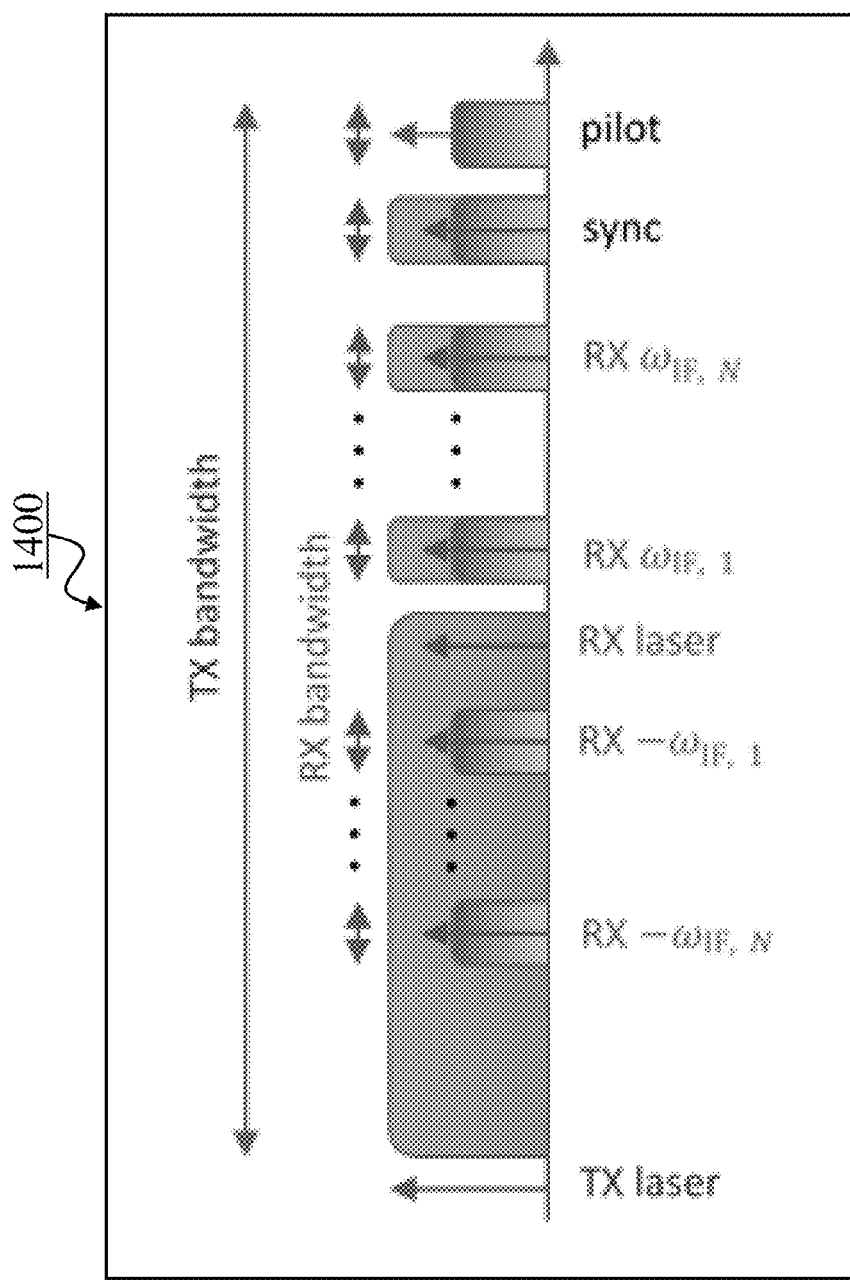
FIG. 14 is a schematic view of a diagram illustrating potential bandwidth allocation with multiple quantum channels that are fixed for one side band.

Reference is made to FIG. 14 which is a schematic view of a diagram 1400 of a potential bandwidth allocation with multiple quantum channels that are fixed for one side band. The quantum channels are multiplexed with a synchronization channel (sync) and a pilot tone (pilot). The estimation of the time and frequency dependent phase change can be based on the pilot tone and the synchronization channel jointly. The intermediate frequencies at the receiver CV-QKD device 'B' 430 need to be adapted to the transmit signal, this requirement could be ignored for the quantum channel(s), as described above. The power ratios, transmit side intermediate frequencies, frequency separations between the different bands, and bandwidths may further be chosen to optimize the key rate.

In some embodiments of the application, it is also possible to multiplex higher-power service channel(s) with modulated signals that carry synchronization information. For example, the time and frequency dependent phase changes may be estimated from such a service channel as well as frame synchronization (as shown in FIG. 14).

A possible implementation is that the initial stream of data is correlated with the root-raised-cosine shape in the frequency domain for a rough carrier frequency offset estimate. This value can be used for a rough down-conversion and filtering before a phase noise estimation is done. The phase noise estimation can be done by comparing the known training sequence in time domain with the received data stream. This can be supported by other symbols in the synchronization channels, since their modulation format is known. For Quadrature Phase Shift Keying (QPSK), e.g., the forth power of each symbol can be taken, which rotates any QPSK modulated point into the first quadrant. The phase difference to 1+i can be measured and used as phase noise estimate.

Moreover, as soon as the data in the synchronization channel is decoded, this information can be used to update the phase noise estimation by comparing the incoming signal with the now known information. This allows to do phase noise compensation also for samples between symbols, since the pulse shape is also known.

Furthermore, the clocks for digital-to-analog conversion at the transmitter CV-QKD device 'A' 420 and analog-to-digital conversion at the receiver CV-QKD device 'B' 430 need to be aligned in frequency and phase for maximum performance. A delay or phase between these two clocks is a phase ramp in frequency domain. Moreover, the delay may be estimated with the conventional Godard algorithm. After the matched filtering, the key-id channel may be shaped with a raised-cosine and by mixing both raised-cosine tails of the detected synchronization channel, the fractional delay between the two clocks may be identified.

In addition, since the quantum channel is processed with the same clocks and both channels are separated by tens of megahertz and, therefore, do not suffer from chromatic dispersion, the delay in the quantum channel is the same as the delay in the key-id channel.

The synchronization channel may be correlated with the known training sequence to identify the frame start and find the remaining phase offset between the transmitted and received data. For example, if a previous frame start is known, it is sufficient to correlate the training sequence with the part of the data where the next training sequence is expected, check for continuous locking, and calculate the phase offset.

Moreover, the quantum channel based phase-change may be estimated, for example, if some of the transmitted symbols or samples are revealed by the transmitter CV-QKD device 'A' 420 over a reliable channel, the receiver CV-QKD device 'B' 430 can use this information to estimate the phase change. The more samples or symbols are revealed, the less efficient the protocol becomes. Although the quantum channel is of weak power, the signal-to-noise ratio of the estimation can be improved by averaging over many symbols or samples. But, by averaging one limits the ability to track the high frequency components in the time dependent phase change. In the limit of an infinite averaging, it may be possible to estimate a constant phase. A trade-off decision has to be taken that improves the signal-to-noise ratio while tracking the dominant frequencies in the phase change and keeping the protocol efficiency high. As long as transmit and receive side laser frequencies are not well matched, the estimation accuracy will be rather poor. This might be solved with an iterative algorithm that tries to match the signal in frequency and time.

Moreover, the time-interleaved training sequence may be done, for example, by adding dedicated higher-power training symbols in-between the quantum symbols that are known to the transmitter CV-QKD device 'A' 420 and the receiver CV-QKD device 'B' 430, the accuracy of the phase-change estimation may further be improved.

Furthermore, the limited training in the quantum communication channel 410 may be performed, for example, it may be possible to limit or even drop the training sequence in the quantum communication channel 410, which would increase the efficiency of the communication. The phase relation between the quantum channel(s) and the synchronization channel(s) would need to be calibrated and well known. For instance, one possibility is insert calibration data from time to time in the quantum and synchronization channel(s). These calibration can be used to estimate the phase relation between the synchronization and quantum channel(s).

Furthermore, the slow phase and frequency drift may be compensated, for example, comparing the estimates from many consecutive frames reveals slow phase and frequency drifts. These drifts might also be communicated and applied or compensated.

Moreover, for the channel allocations, a plurality of combinations of quantum, synchronization and pilot tone channel frequency allocations, bandwidths and power ratios may be provided. The allocations are optimized according to the conditions of the physical channel, inter-channel interference versus bandwidth efficiency trade-offs, and the requirements for the estimation accuracy for the correction of phase noise and sampling clock recovery. For instance, the synchronization channel and/or pilot tone power and at the same time the frequency separation between them and the quantum channel might be increased for scenarios with higher loss compared to scenarios with low loss between the receiver CV-QKD device 'B' 430 and the transmitter CV-QKD device 'A' 420.

Furthermore, for the orthogonal frequency division multiplexing, it may be possible to utilize OFDM for multiplexing and de-multiplexing the quantum channel(s) and synchronization channel(s). Some sub-channels may be allocated with quantum signal, some sub-channels with synchronization signals and some sub-channels will remain empty to guard the quantum signal.

In particular, it has to be taken care of that the quantum channel(s) do not suffer from remaining inter-channel interference phase noise even after phase noise compensation. This noise might still be significant, since the synchronization channel(s) is (are) typically allocated with significantly more power. Therefore, the sub-carrier(s) loaded with quantum signals has (have) to be guarded with empty sub-carriers in the OFDM setup.

In addition, a partial feedback may be sent and a partial compensation may be performed. For example, in general it is a good strategy to compensate as much of the time and frequency dependent phase change as possible at the receiver CV-QKD device 'B' 430 to keep the amount of information that needs to be feed back to the transmitter CV-QKD device 'A' 420 low. The phase noise and clock skew are examples for impairments that can be fixed at the receiver CV-QKD device 'B' 430. Constant phase and carrier frequency offset are examples for impairments that may be communicated to the transmitter CV-QKD device 'A' 420 and applied at the transmitter CV-QKD device 'A' 420, since this information cannot be recovered at the receiver CV-QKD device 'B' 430 after a single quadrature measurement.

Moreover, the receiver side phase noise may also be compensated, for example, the found phase noise estimate from the pilot tone(s) and/or the synchronization channel(s), can be used to compensate the phase noise in the quantum and synchronization channel(s). After this step, all recoverable energy is in a well-defined frequency range for each channel (unless there are large sampling clock frequency differences).

In addition, the receiver side clock-skew may also be compensated, for example, the delay can be compensated by multiplying the frequency domain representation with a phase ramp. The delay used for compensation is a low-pass filtered version of the estimated delays from consecutive blocks of data. The fractional delay in the quantum channel can be compensated with the delay estimated in the synchronization channel.

Figure 15:
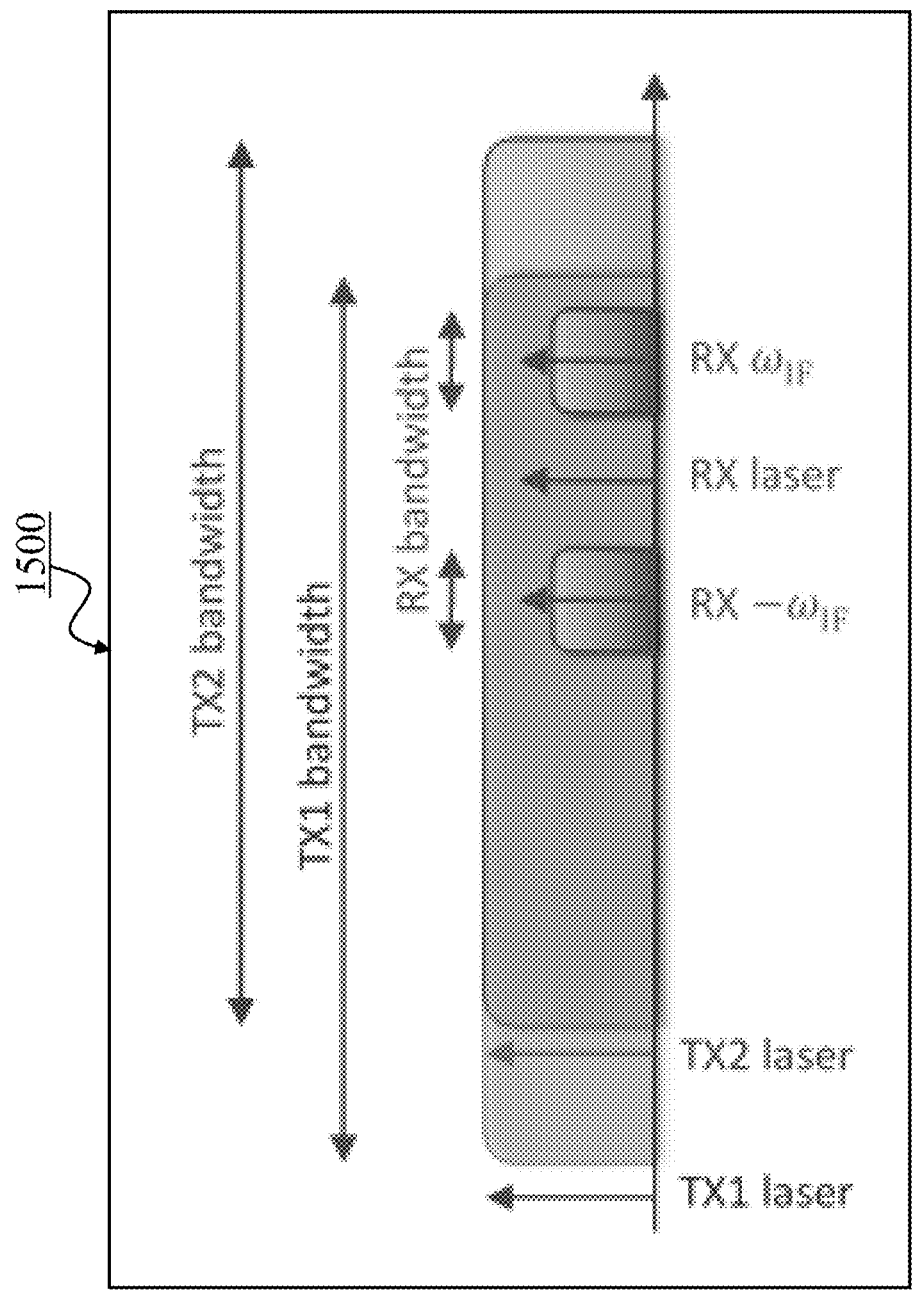
FIG. 15 is a schematic view of a diagram illustrating a potential bandwidth allocation with two transmitters and a single receiver, where transmit and receive lasers are not aligned in phase and frequency and each transmit side bandwidth is larger than the receiver bandwidth.

In some embodiments of the application, multiple QKD devices may be synchronized. For example, two or more transmitters CV-QKD send signals to a single receiver CV-QKD that will measure a superposition of the received signals as shown in FIG. 15 and with a potential bandwidth allocation in FIG. 15. Each transmitter CV-QKD device sends with a larger bandwidth than the receiver CV-QKD device, but they do not need to be identical.

Moreover, the phase changes need to be measured individually for each of the signals, respectively. The synchronization channel (pilot tone) assisted estimation of the phase changes is based on synchronization channels (pilot tones) that are orthogonal in frequency to the other transmit signals, respectively.

Reference is made to FIG. 15 which is a schematic view of a diagram 1500 of a potential bandwidth allocation with two transmitters CV-QKD devices and a single receiver CV-QKD device, where transmit and receive lasers are not aligned in phase and frequency and each transmit side bandwidth is larger than the receiver bandwidth. The receiver CV-QKD device is able to capture some part of each of the transmit bandwidths. The frequency differences between all three lasers are exemplary and might change over time. The intermediate frequency of the receiver CV-QKD device 430 might be constant or changing over time. It might be fixed, adaptive or randomly chosen. The receiver CV-QKD device 430 structure might be any of the structures shown in FIGS. 17a, 17b, 17c and 17d. Therefore, the bandwidth allocation may not need to be with an up-converting transmitter and a heterodyne receiver as shown in this Figure. This Embodiment might be combined with other embodiments of the application, for example, with the multiple quantum bands and/or the synchronization channels and/or the pilot tones.

Reference is made to FIG. 16 which is a schematic view of a diagram 1600 of an adaptation of the reverse synchronization idea for MDI-CV-QKD.

An example for multi device synchronization is given by measurement-device-independent continues-variable quantum key distribution. Two transmitters CV-QKD devices 'A' 420 and 1620 send coherent states in the same mode to a single receiver CV-QKD device 13' 430, which beats the two incoming signals and measures, e.g., the in-phase component of the additive superposition and the quadrature component of the subtractive superposition. In general, the measurement collapses the four degrees of freedom (two degrees per transmitter) into two independent measurement outcomes. The measurement outcomes are announced by the receiver CV-QKD device 'B' 430. Each transmitter CV-QKD device 'A' 420 can derive from its own transmit information and the public announcement some information about the transmit signal of the other transmitter CV-QKD device 'A' 420 and 1620, respectively. Under some conditions, the bound to the information an eavesdropper can have about the transmit states of the two transmitters 420 and 1620, even if it has all the power of the universe and even if it controls the receiver CV-QKD 430, is smaller than the information the transmitters CV-QKD 420 and 1620 will have about the transmit state of the peer. This allows to distil a key with the big advantage that you can theoretically use an arbitrarily bad receiver. But, the quality of the receiver has a big influence on possible key rates.

The invention idea extends for this case as depicted in FIG. 16, both transmitters 420 and 1620 send and cache signals of a large bandwidth. The individual bandwidths of the two transmitters 420 and 1620 do not need to be aligned in carrier frequency and phase and they also do not need to be synchronized in the sampling clock. Having full synchronization between three parties would be a very difficult analog task, which may be needed without the use of devices, system and methods of the present application. Here, the transmitted bandwidths would need to overlap partially in the measurement of the receiver CV-QKD device 430 and the receiver CV-QKD device 430 captures some part of the overlap. The effective quantum channel may be determined by the measurements of the receiver CV-QKD device 'B' 430. Since the measurement at the receiver CV-QKD device 'B' 430 collapse half the degrees of freedom in the optical field, not all synchronization task can be done at the receiver in the digital domain. Therefore, the information about the mode of the effective quantum channel and how it is related to the transmitted signals is communicated to the transmitter CV-QKD device 'A' 420 and 1620. The transmitter CV-QKD device 'A' 420 and 1620 can then deduce from the high bandwidth transmit signal the effective transmit states.

In FIG. 16 which illustrates an adaptation of the reverse synchronization for the MDI-CV-QKD. Party Alice (the transmitter CV-QKD device 'A' 420) prepares and remembers the state $|\tilde{x}_A(t)\rangle$ of high bandwidth, which will be changed by the time dependent channel $T_A e^{i\varphi_A(t)}$ to $|T_A e^{i\varphi_A(t)} \tilde{x}_A(t)\rangle$. Party Bob (the transmitter CV-QKD device 'A' 1620) prepares and remembers state (t)) of high bandwidth, which will be changed by the time dependent channel $T_B e^{i\varphi_B(t)}$ to $|T_B e^{i\varphi_B(t)} \tilde{x}_B(t)\rangle$. Without loss of generality the channels are limited to frequency independent channels, the same setup works for frequency selective channels, them party Charlie (the receiver CV-QKD device 'B' 430) beats the two states in a beam splitter to obtain the superimposed states $|\sqrt{2}T_A e^{i\varphi_A(t)} \tilde{x}_A(t) + \sqrt{2}T_B e^{i\varphi_B(t)} \tilde{x}_B(t)\rangle$ and $|\sqrt{2}T_A e^{i\varphi_A(t)} \tilde{x}_A(t) - \sqrt{2}T_B e^{i\varphi_B(t)} \tilde{x}_B(t)\rangle$. Party Charlie (the receiver CV-QKD device 'B' 430) now performs a single quadrature measurement on one of the states and the orthogonal single quadrature measurement on the other state. These measurements, followed by some signal processing like a root-raised-cosine filter, define the interpretation of the quadrature components, the central frequency and phase of the effective quantum channel 1601.

These measurement results are then disclosed as it is typical in MDI-CV-QKD protocols. The phase changes introduced by the two channels are estimated by the receiver (the receiver CV-QKD device 'B' 430 for both channels individually (1602A/1602B).

The estimated phase changes $\tilde{\varphi}_A[m]$ and $\tilde{\varphi}_B[m]$ are disclosed and communicated to the corresponding transmitters, respectively (1603A/1603B).

The transmitters apply their corresponding phase changes to their remembered transmit states and the additional processing of the receiver to extract the effective transmit state (1604A/1604B), which will then be used in the following post-processing steps.

Moreover, the second transmitter CV-QKD device may be a part of receiver CV-QKD device. For example, it may be to declare the second transmitter of MDI-CV-QKD as part of the receiver structure, which results in a point-to-point quantum key distribution system with much relaxed requirements on the quality of the receiver structure. The proposed invention idea can also be applied to this case.

Generally, a fixed channel allocation on one side of several quantum channels and a single synchronization channel (no pilot tone) may be used. All phase changes may be estimated from the service channel and a rare synchronization between the service channel and the quantum channels. The carrier frequency offset and the constant phase may be reported to the transmitter CV-QKD device.

The present application has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A method for operating a continuous variable-quantum key distribution (CV-QKD) system comprising a CV-QKD transmitter and a CV-QKD receiver, the method comprising:
    storing and transmitting, by the CV-QKD transmitter, a quantum signal over a communication channel, wherein the quantum signal has a first phase, a first central frequency, a first pulse shape, and a first bandwidth;
    receiving, by the CV-QKD receiver, the quantum signal via the communication channel and via a reception band of the CV-QKD receiver, the reception band having a second central frequency and a second bandwidth, wherein the second central frequency is offset from the first central frequency by a frequency shift caused by the communication channel, wherein the received quantum signal has a second phase and a second pulse shape, wherein the second phase is offset from the first phase by a phase shift caused by the communication channel and the second pulse shape is offset from the first pulse shape by a delay caused by the communication channel;
    determining, by the CV-QKD receiver, a quantum communication channel based on the phase shift, the frequency shift, the delay, and a third bandwidth resulting from an overlap between the first bandwidth around the first central frequency and the second bandwidth around the second central frequency;
    communicating, by the CV-QKD receiver, the determined quantum communication channel to the CV-QKD transmitter over an authenticated communication channel;
    obtaining, by the CV-QKD transmitter, a modified quantum signal by modifying the stored quantum signal based on the determined quantum communication channel; and
    generating, by the CV-QKD transmitter and the CV-QKD receiver, a secret key using the modified quantum signal and the received quantum signal.

2. The method according to claim 1, wherein:
    the first bandwidth is larger than the third bandwidth,
    the method further comprising allocating a larger bandwidth to the CV-QKD transmitter than to the CV-QKD receiver, and wherein the allocated bandwidth of the CV-QKD receiver is within the allocated bandwidth of the CV-QKD transmitter.

3. The method according to claim 1, further comprising:
    modulating the quantum signal that is transmitted by the CV-QKD transmitter based on a Gaussian modulation scheme, wherein each quantum signal is obtained from a quantum random number generator, and comprises a real part associated with an in-phase component of an optical field of CV-QKD system and an imaginary part associated with a quadrature component of the optical field.

4. The method according to claim 1, further comprising at least one of:
upconverting, a quantum signal of the CV-QKD transmitter to a single-side-band signal with a first intermediate frequency, or
down-converting a quantum signal of the CV-QKD receiver from a second intermediate frequency.

5. The method according to claim 1, further comprising: allocating a mirror band to a quantum signal of the CV-QKD receiver, wherein a part of a quantum signal of the CV-QKD transmitter is within the mirror band, and wherein the method further comprises:
receiving, by the CV-QKD receiver, a part of the quantum signal that is transmitted by the CV-QKD transmitter and is within the mirror band.

6. The method according to claim 1, further comprising: allocating multiple quantum bands to the CV-QKD receiver, wherein each quantum band is associated with a respective second intermediate frequency, and wherein each allocated quantum band has a mirror band.

7. The method according to claim 1, further comprising: transmitting, by the CV-QKD transmitter, two quantum signals each having a different first bandwidth, wherein the two quantum signals comprise:
a first transmitted quantum signal associated with a respective first bandwidth that is equal to a third bandwidth of a given allocated quantum band of the CV-QKD receiver, wherein the first transmitted quantum signal of the CV-QKD transmitter overlaps the given allocated quantum band of the CV-QKD receiver, and
a second transmitted quantum signal associated with a respective first bandwidth that is larger than the third bandwidth of a mirror band of the given quantum signal of the CV-QKD receiver, wherein the second transmitted quantum signal is within the mirror band.

8. The method according to claim 7, further comprising: receiving, by the CV-QKD receiver, at least one of the first transmitted quantum signal or the second transmitted quantum signal, at least in part, and the received quantum signals mix in a down-conversion operation.

9. The method according to claim 1, further comprising: multiplexing, at least one of one or more pilot tones or a synchronization channel with the quantum communication channel, in order to estimate at least one of a time or frequency dependent phase shift or a time dependent frequency shift or a time or frequency dependent delay, and
determining, by the CV-QKD receiver, the quantum communication channel based on at least one of the estimated time or a frequency dependent phase change.

10. The method according to claim 9, further comprising at least one of:
multiplexing the quantum signals and the synchronization channel using orthogonal frequency-division multiplexing (OFDM) by allocating a first set of OFDM sub-channels to the quantum signals and a second set of OFDM sub-channels to the synchronization channel, and using a third set of OFDM sub-channels for guarding the quantum signals; or
de-multiplexing the quantum signals and the synchronization channel using OFDM by allocating a first set of OFDM sub-channels to the quantum signals and a second set of OFDM sub-channels to the synchronization channel, and using a third set of OFDM sub-channels for guarding the quantum signals.

11. The method according to claim 9, further comprising: compensating, by the CV-QKD receiver, at least one of:
the phase shift based on estimating a phase noise from at least one of the one or more pilot tones and/or the synchronization channel, or
the delay based on estimating a delay from the synchronization channel.

12. The method according to claim 1, further comprising at least one of:
multiplexing the quantum signals using orthogonal frequency-division multiplexing OFDM by allocating a first set of OFDM sub-channels to the quantum signals and using a second set of OFDM sub-channels for guarding the quantum signals; or
de-multiplexing the quantum signals using OFDM by allocating a first set of OFDM sub-channels to the quantum signals and using a second set of OFDM sub-channels for guarding the quantum signals.

13. The method according to claim 1, wherein the CV-QKD system is based on a measurement-device-independent (MDI) CV-QKD system comprising multiple QKD devices including two or more CV-QKD transmitters and at least one CV-QKD receiver, wherein the method further comprises:
storing and transmitting, for each CV-QKD transmitter, a respective quantum signal over a respective communication channel, wherein each respective quantum signal has a respective first phase, a respective first central frequency, a respective first pulse shape, and a respective first bandwidth;
receiving, by the at least one CV-QKD receiver, a combined quantum signal comprising the multiple transmitted quantum signals via the communication channels and via a reception band of the CV-QKD receiver, the reception band having a second central frequency and a second bandwidths, wherein the second central frequency is offset from the first central frequencies by frequency shifts caused by the communication channels, wherein the received combined quantum signal has a second phase and a second pulse shape, wherein the second phase is offset from the first phases by phase shifts caused by the communication channels, and the second pulse shape is offset from the first pulse shapes by delays caused by the communication channels;
determining the quantum communication channels based on the phase shifts, the frequency shifts, the delays, and third bandwidths resulting from overlaps between the first bandwidths around the first central frequencies and the second bandwidths around the second central frequency;
communicating the determined quantum communication channels over authenticated communication channels;
obtaining, individually, for each respective CV-QKD transmitter, a respective modified quantum signal by modifying corresponding stored quantum signal based on respective determined quantum communication channel; and
generating a secret key using a respective modified quantum signal and the received combined quantum signal.

14. A continuous variable-quantum key distribution (CV-QKD) transmitter, comprising a memory configured to store a set of program codes, and a processor coupled to the memory, wherein the set of program codes causes the processor to be configured to:

transmit to a CV-QKD receiver and store, a quantum signal over a communication channel, wherein the quantum signal has a first phase, a first central frequency, a first pulse shape, and a first bandwidth;

receive, from the CV-QKD receiver, a determined quantum communication channel, a phase shift, a frequency shift, a delay, and a third bandwidth over an authenticated communication channel;

obtain a modified quantum signal by modifying the stored quantum signal based on the phase shift, the frequency shift, the delay, and the third bandwidth; and generate a secret key using the modified quantum signal.

15. The CV-QKD transmitter according to claim 14, wherein the set of program codes further causes the processor to be configured to:

transmit two quantum signals each having a different first bandwidth, wherein the two quantum signals comprise:

a first transmitted quantum signal associated with a respective first bandwidth that is equal to a third bandwidth of a given allocated quantum band of the CV-QKD receiver, wherein the first transmitted quantum signal of the CV-QKD transmitter overlaps the given allocated quantum band of the CV-QKD receiver, and a second transmitted quantum signal associated with a respective first bandwidth that is larger than the third bandwidth of a mirror band of the given quantum signal of the CV-QKD receiver, wherein the second transmitted quantum signal is within the mirror band.

16. A continuous variable-quantum key distribution (CV-QKD) receiver, comprising a memory configured to store a set of program codes, and a processor coupled to the memory, wherein the set of program codes causes the processor to be configured to:

receive, from a CV-QKD transmitter, a quantum signal over a communication channel, wherein the quantum signal that is transmitted by the CV-QKD transmitter has a first phase, a first central frequency, a first pulse shape, and a first bandwidth, the quantum signal via the communication channel and via a reception band of the CV-QKD receiver, the reception band having a second central frequency and a second bandwidth, wherein the second central frequency is offset from the first central frequency by a frequency shift caused by the communication channel, wherein the received quantum signal has a second phase and a second pulse shape, wherein the second phase is offset from the first phase by a phase shift caused by the communication channel and the second pulse shape is offset from the first pulse shape by a delay caused by the communication channel;

determine a quantum communication channel based on the received quantum signal, the phase shift, the frequency shift, the delay, and a third bandwidth resulting from an overlap between the first bandwidth around the first central frequency and the second bandwidth around the second central frequency;

send, to the CV-QKD transmitter, the determined quantum communication channel, the phase shift, the frequency shift, the delay, and the third bandwidth over an authenticated communication channel; and generate a secret key using the received quantum signal.

17. The CV-QKD receiver according to claim 16, wherein the set of program codes further causes the processor to be configured to:

allocate a mirror band to a given quantum signal, wherein a part of a quantum signal of the CV-QKD transmitter is within the mirror band, and wherein the set of program codes further causes the processor to be configured to:

receive a part of the quantum signal that is transmitted by the CV-QKD transmitter and is within the mirror band.

18. The CV-QKD receiver according to claim 16, wherein the set of program codes further causes the processor to be configured to:

allocate multiple quantum bands each associated with a respective second intermediate frequency, wherein each allocated quantum band has a mirror band.

19. The CV-QKD receiver according to claim 16, wherein the set of program codes further causes the processor to be configured to:

receive, from the CV-QKD transmitter, two quantum signals that are transmitted by the CV-QKD transmitter, each having a different first bandwidth, at least in part, and the received quantum signals mix in a down-conversion operation.

20. The CV-QKD receiver according to claim 16, wherein the set of program codes further causes the processor to be configured to:

compensate at least one of:

the phase shift based on estimating a phase noise from at least one of one or more pilot tones or a synchronization channel, or the delay based on estimating a delay from the synchronization channel.

\* \* \* \* \*

UNITED STATES PATENT AND TRADEMARK OFFICE
CERTIFICATE OF CORRECTION

PATENT NO. : 11,777,723 B2
APPLICATION NO. : 17/372318
DATED : October 3, 2023
INVENTOR(S) : Hans Brunner Page 1 of 1

It is certified that error appears in the above-identified patent and that said Letters Patent is hereby corrected as shown below:

In the Claims

Claim 11: Column 30, Line 10: "least one of the one or more pilot tones and/or the" should read -- least one of the one or more pilot tones or the --.

Claim 12: Column 30, Line 17: "quency-division multiplexing OFDM by allocating a" should read -- quency-division multiplexing (OFDM) by allocating a --.

Claim 13: Column 30, Line 42: "and a second bandwidths, wherein the second central" should read -- and a second bandwidth, wherein the second central --.

Claim 13: Column 30, Line 55: "the second bandwidths around the second central fre-" should read -- the second bandwidth around the second central fre- --.

Signed and Sealed this
Sixteenth Day of January, 2024

Katherine Kelly Vidal
*Director of the United States Patent and Trademark Office*